(12) United States Patent
Abe et al.

(10) Patent No.: US 12,413,834 B2
(45) Date of Patent: Sep. 9, 2025

(54) IMAGING ELEMENT UNIT AND IMAGING DEVICE

(71) Applicant: FUJIFILM Corporation, Tokyo (JP)

(72) Inventors: Takuro Abe, Saitama (JP); Kouhei Awazu, Saitama (JP); Yuta Watanabe, Saitama (JP); Yuta Abe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 208 days.

(21) Appl. No.: 18/451,121

(22) Filed: Aug. 17, 2023

(65) Prior Publication Data
US 2023/0396863 A1    Dec. 7, 2023

Related U.S. Application Data

(63) Continuation of application No. PCT/JP2021/044148, filed on Dec. 1, 2021.

(30) Foreign Application Priority Data

Feb. 24, 2021 (JP) .................................. 2021-027337

(51) Int. Cl.
  *H04N 23/52*    (2023.01)
  *H04N 23/51*    (2023.01)
  *H04N 23/68*    (2023.01)

(52) U.S. Cl.
  CPC ............. *H04N 23/52* (2023.01); *H04N 23/51* (2023.01); *H04N 23/687* (2023.01)

(58) Field of Classification Search
  CPC ...... H04N 23/52; H04N 23/51; H04N 23/687; H04N 23/54; H01L 23/36
  See application file for complete search history.

(56) References Cited

U.S. PATENT DOCUMENTS

2018/0039162 A1*  2/2018  Ali ..................... G02B 7/028
2019/0163036 A1*  5/2019  Kamada ............... H05K 7/2039
(Continued)

FOREIGN PATENT DOCUMENTS

| JP | 5168047   | 3/2013 |
| JP | 2020067632 | 4/2020 |

(Continued)

OTHER PUBLICATIONS

"International Search Report (Form PCT/ISA/210) of PCT/JP2021/044148", mailed on Mar. 1, 2022, with English translation thereof, pp. 1-5.

(Continued)

*Primary Examiner* — Mekonnen D Dagnew
(74) *Attorney, Agent, or Firm* — JCIPRNET

(57) ABSTRACT

An imaging element unit that is built in a housing of an imaging device includes an imaging element that includes an imaging surface imaging a subject and a back surface opposite to the imaging surface, a circuit board which is mounted on the back surface and in which an opening causing a part of the back surface to be exposed therethrough is formed, and a first heat conductive member and a second heat conductive member to which driving heat of the imaging element is conducted. The first heat conductive member is connected to the second heat conductive member and has elasticity higher than elasticity of the second heat conductive member, and the second heat conductive member is connected to the back surface via the opening.

13 Claims, 16 Drawing Sheets

(56) References Cited

U.S. PATENT DOCUMENTS

2020/0137271 A1* 4/2020 Sugino .................. H04N 23/57
2023/0164408 A1* 5/2023 Endo .................. H05K 7/20145
                                                                  348/333.06

FOREIGN PATENT DOCUMENTS

SG   11202109728   10/2021
WO    2020202811   10/2020

OTHER PUBLICATIONS

"Written Opinion of the International Searching Authority (Form PCT/ISA/237) of PCT/JP2021/044148", mailed on Mar. 1, 2022, with English translation thereof, pp. 1-10.

* cited by examiner

FIG. 10
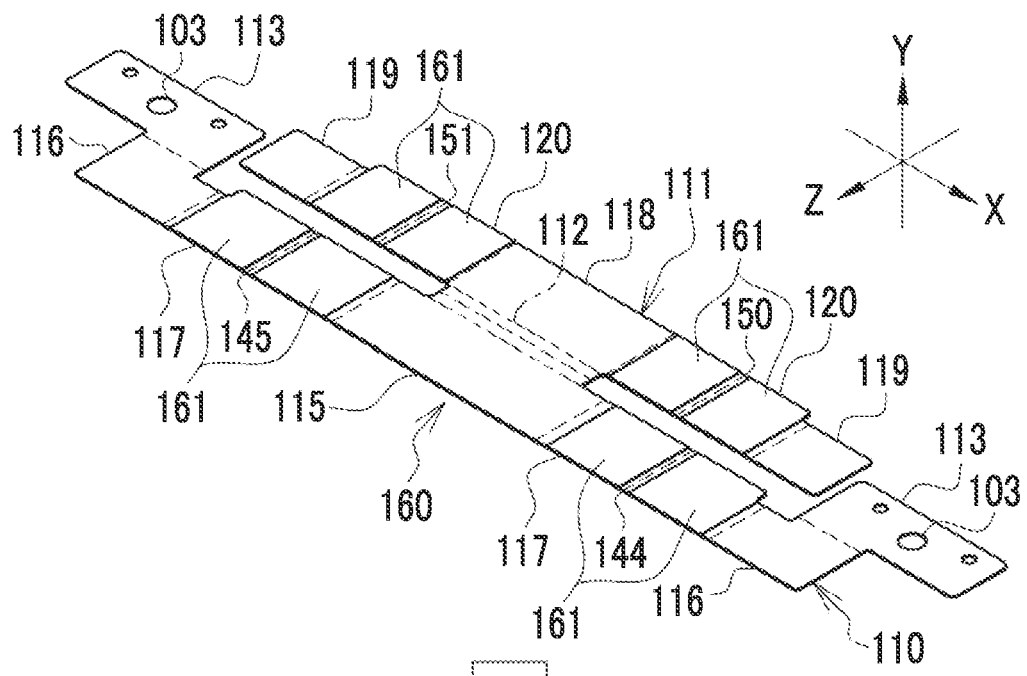
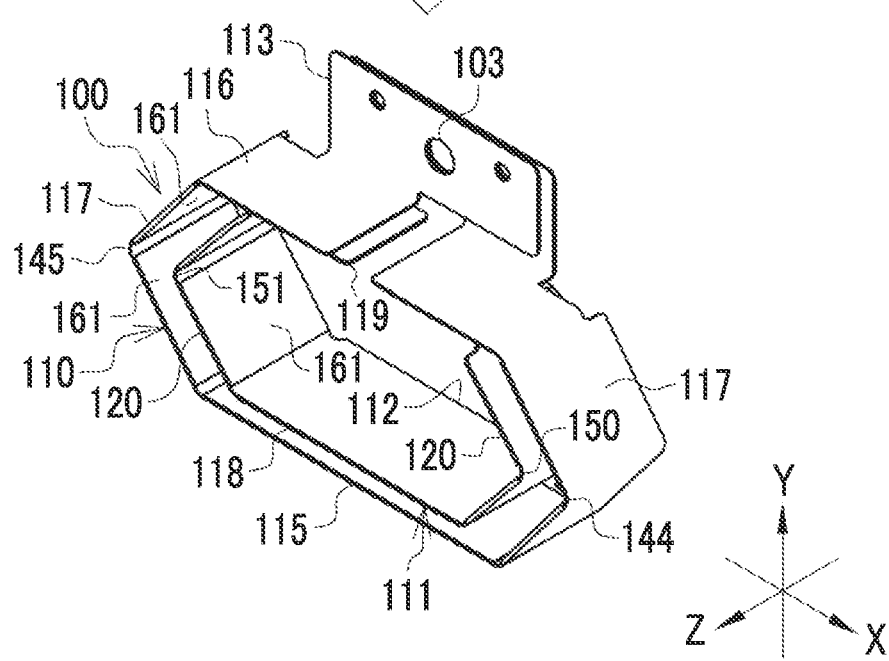

IMAGING ELEMENT UNIT AND IMAGING DEVICE

CROSS-REFERENCE TO RELATED APPLICATIONS

This application is a continuation application of International Application No. PCT/JP2021/044148 filed on Dec. 1, 2021, the disclosure of which is incorporated herein by reference in its entirety. Further, this application claims priority from Japanese Patent Application No. 2021-027337 filed on Feb. 24, 2021, the disclosure of which is incorporated herein by reference in its entirety.

BACKGROUND

1. Technical Field

A technique of the present disclosure relates to an imaging element unit and an imaging device.

2. Description of the Related Art

JP5168047B discloses a camera comprising a heat dissipation structure of an imaging element mounted on a camera shake correction unit. In the heat dissipation structure, a heat dissipation member is provided near the camera shake correction unit and a metal member positioned near the imaging element in the camera shake correction unit is connected to the heat dissipation member by a flexible member having thermal conductivity. The heat dissipation member has a ring shape to surround the metal member, a plurality of extending portions are formed at an outer peripheral edge of the heat dissipation member, and the plurality of extending portions are fixed to a lens barrel of a frame of the camera.

JP2020-067632A discloses an imaging device that comprises an imaging sensor, a sensor substrate on which the imaging sensor is mounted, and a metal holder having an outer shape larger than that of the imaging sensor. The sensor substrate is provided with an opening portion that causes an exposed portion as a part of a main surface of the imaging sensor to be exposed therethrough, and the metal holder is adapted to be in direct contact with the exposed portion through the opening portion.

SUMMARY

An embodiment according to a technique of the present disclosure provides an imaging element unit and an imaging device that can make it difficult for a heat conductive member to which driving heat of an imaging element is conducted to be peeled off from the imaging element.

An imaging element unit according to an aspect of the present disclosure is an imaging element unit that is built in a housing of an imaging device. The imaging element unit comprises an imaging element that includes an imaging surface imaging a subject and a back surface opposite to the imaging surface, a circuit board which is mounted on the back surface and in which an opening causing a part of the back surface to be exposed therethrough is formed, and a first heat conductive member and a second heat conductive member to which driving heat of the imaging element is conducted. The first heat conductive member is connected to the second heat conductive member and has elasticity higher than elasticity of the second heat conductive member, and the second heat conductive member is connected to the back surface via the opening.

It is preferable that the imaging element unit has an anti-vibration function of moving the imaging element in plane directions of the imaging surface and the first heat conductive member is deformed to be capable of following movement of the imaging element caused by the anti-vibration function.

It is preferable that the second heat conductive member includes a first piece connected to a part of the back surface and facing the back surface and a second piece bent from the first piece and the first heat conductive member is connected to the second piece.

It is preferable that the second piece extends in a normal direction of the imaging surface and the back surface.

It is preferable that the imaging element further comprises a flexible board mounted on the circuit board and the flexible board is disposed on one side of the second piece opposite to the first heat conductive member.

It is preferable that a thermal conductivity of the second heat conductive member is higher than a thermal conductivity of the first heat conductive member.

It is preferable that the second heat conductive member is thicker than the first heat conductive member.

It is preferable that the opening causes a central region of the back surface to be exposed therethrough. It is preferable that the central region is a region in which identification information of the imaging element is written.

It is preferable that the first heat conductive member is formed of a graphite sheet and the second heat conductive member is made of metal.

An imaging device according to another aspect of the present disclosure comprises a housing and the imaging element unit described above that is built in the housing.

It is preferable that the imaging device further comprises a third heat conductive member connected to the first heat conductive member and the housing is connected to the third heat conductive member and the driving heat is conducted to the housing from the back surface.

It is preferable that the housing and the third heat conductive member are connected to each other by a fourth heat conductive member, each of the first heat conductive member and the fourth heat conductive member is formed of a graphite sheet, and the fourth heat conductive member is thicker than the first heat conductive member.

BRIEF DESCRIPTION OF THE DRAWINGS

Exemplary embodiments according to the technique of the present disclosure will be described in detail based on the following figures, wherein:

FIG. 10 is a diagram showing a state where the first heat conductive member is not yet bent and a state where the first heat conductive member has been bent;

DETAILED DESCRIPTION

An example of an embodiment of a technique of the present disclosure will be described below with reference to the drawings.

First Embodiment

Figure 1:
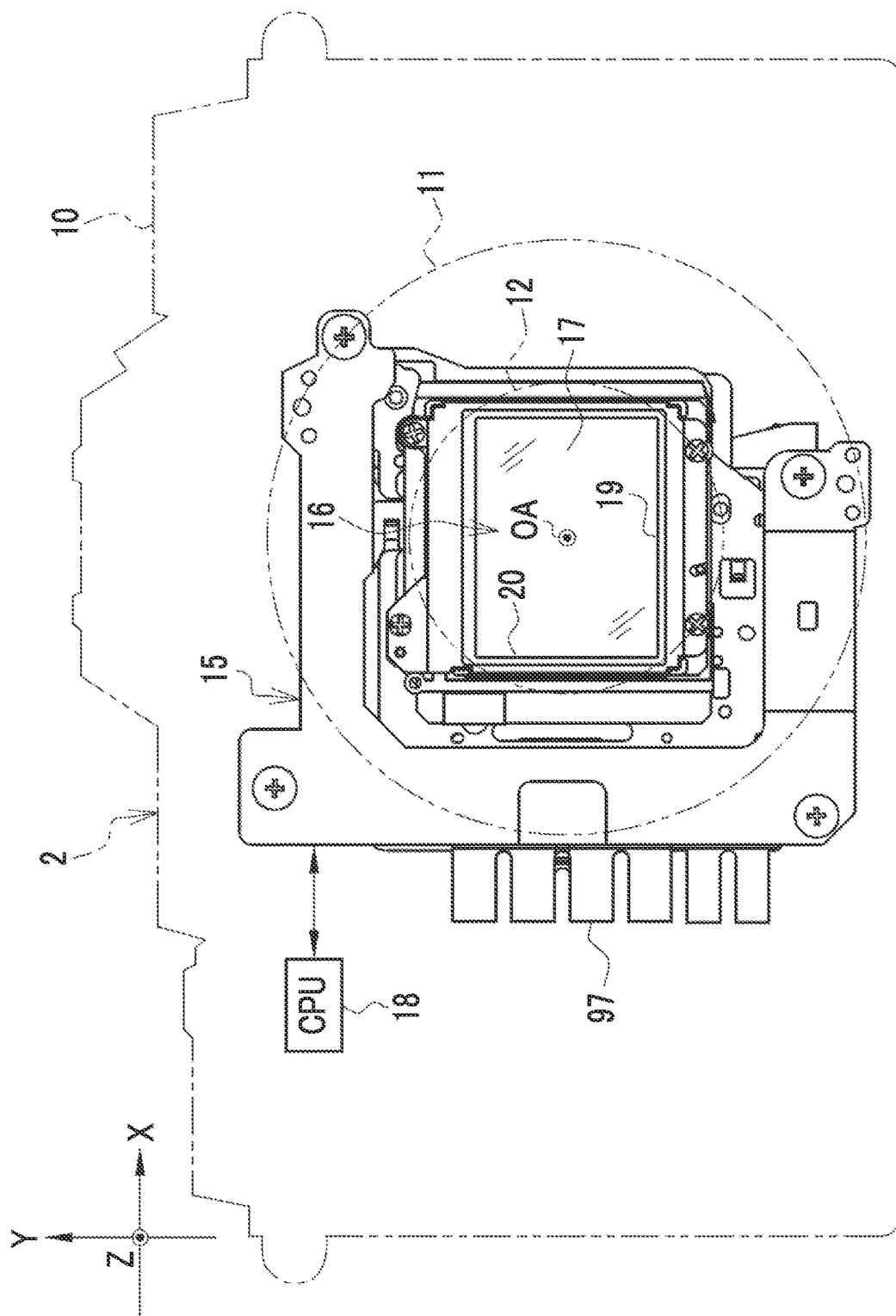
FIG. 1 is a diagram showing a digital camera.

For example, as shown in FIG. 1, a digital camera 2 comprises a camera body 10. A lens mount 11 is provided on a front surface of the camera body 10. The lens mount 11 includes a circular imaging aperture 12. An interchangeable imaging lens (not shown) is attachably and detachably mounted on the lens mount 11. The digital camera 2 is an example of an "imaging device" according to the technique of the present disclosure. Further, the camera body 10 is an example of a "housing" according to the technique of the present disclosure.

An imaging element unit 15 is built in the camera body 10. A rectangular plate-like imaging element 16 is mounted on the imaging element unit 15. The imaging element 16 is, for example, a complementary metal oxide semiconductor (CMOS) image sensor or a charge coupled device (CCD) image sensor. The imaging element 16 includes a rectangular imaging surface 17 that images a subject. The imaging surface 17 receives subject light that indicates the subject. As well known, pixels, which photoelectrically convert the received subject light and output electrical signals, are two-dimensionally arranged on the imaging surface 17. The entire imaging surface 17 is exposed to the outside through the imaging aperture 12.

A central processing unit (CPU) 18 is connected to the imaging element unit 15. The CPU 18 controls the operation of the imaging element unit 15. Although not shown, a read only memory (ROM) and/or a random access memory (RAM), which is a memory, is connected to the CPU 18 via a bus line. A computer is formed of the CPU 18, the memory, and the bus line.

The imaging element unit 15 has an anti-vibration function. The anti-vibration function is a function of suppressing misregistration caused by vibration applied to the camera body 10, that is, relative misregistration between the subject light incident on the imaging surface 17 and the digital camera 2. Examples of the vibration applied to the camera body 10 include a camera shake that is caused by a user who images a subject while holding the camera body 10, and the like.

The imaging element 16 is moved by the anti-vibration function under the control of the CPU 18 in a direction in which misregistration is canceled by a distance that is required to cancel misregistration. More specifically, the imaging element 16 is moved by the anti-vibration function in an X-axis direction that is parallel to a side 19 of the imaging surface 17 of the imaging element 16 and/or a Y-axis direction that is parallel to a side 20 orthogonal to the side 19, that is, intersecting the side 19 at an angle of 90°. The X-axis direction and the Y-axis direction are examples of "plane directions" according to the technique of the present disclosure. In this specification, the terms "orthogonal" and "90°" include not only the meanings of "perfectly orthogonal" and "exact 90°" but also the meanings of "substantially orthogonal" and "about 90°" including errors allowed in design and manufacturing. Further, in this specification, the term "parallel" includes not only the meaning of "perfectly parallel" but also the meaning of "substantially parallel" including errors allowed in design and manufacturing. In the following description, a side corresponding to the side 19 is expressed as "lower" and a side opposite to the side 19 in the Y-axis direction is expressed as "upper". Further, a side corresponding to the side 20 is expressed as "left" and a side opposite to the side 20 in the X-axis direction is expressed as "right".

Here, "misregistration" in this specification refers to a phenomenon that occurs in a case where the position of an optical axis OA varies with respect to a subject due to vibration. The "optical axis OA" refers to an optical axis of subject light that is incident on the imaging surface 17 through the imaging lens. The variation of the position of the optical axis OA means that the optical axis OA is tilted with respect to a reference axis (for example, an optical axis OA obtained in a case where misregistration does not occur yet) due to misregistration. In this specification, canceling misregistration includes not only the meaning of removing misregistration but also the meaning of reducing misregistration.

Figure 2:
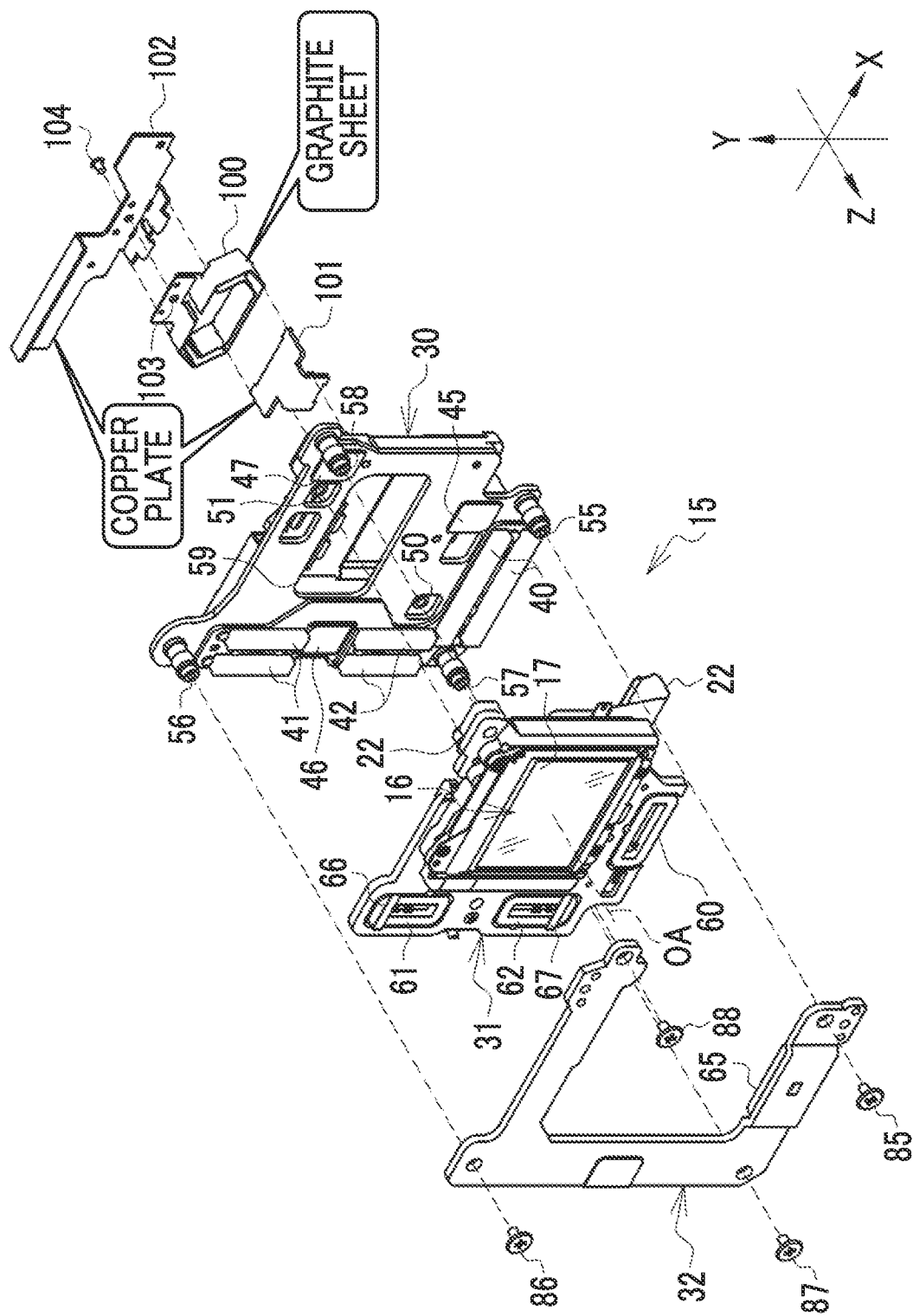
FIG. 2 is a front exploded perspective view of an imaging element unit.
Figure 3:
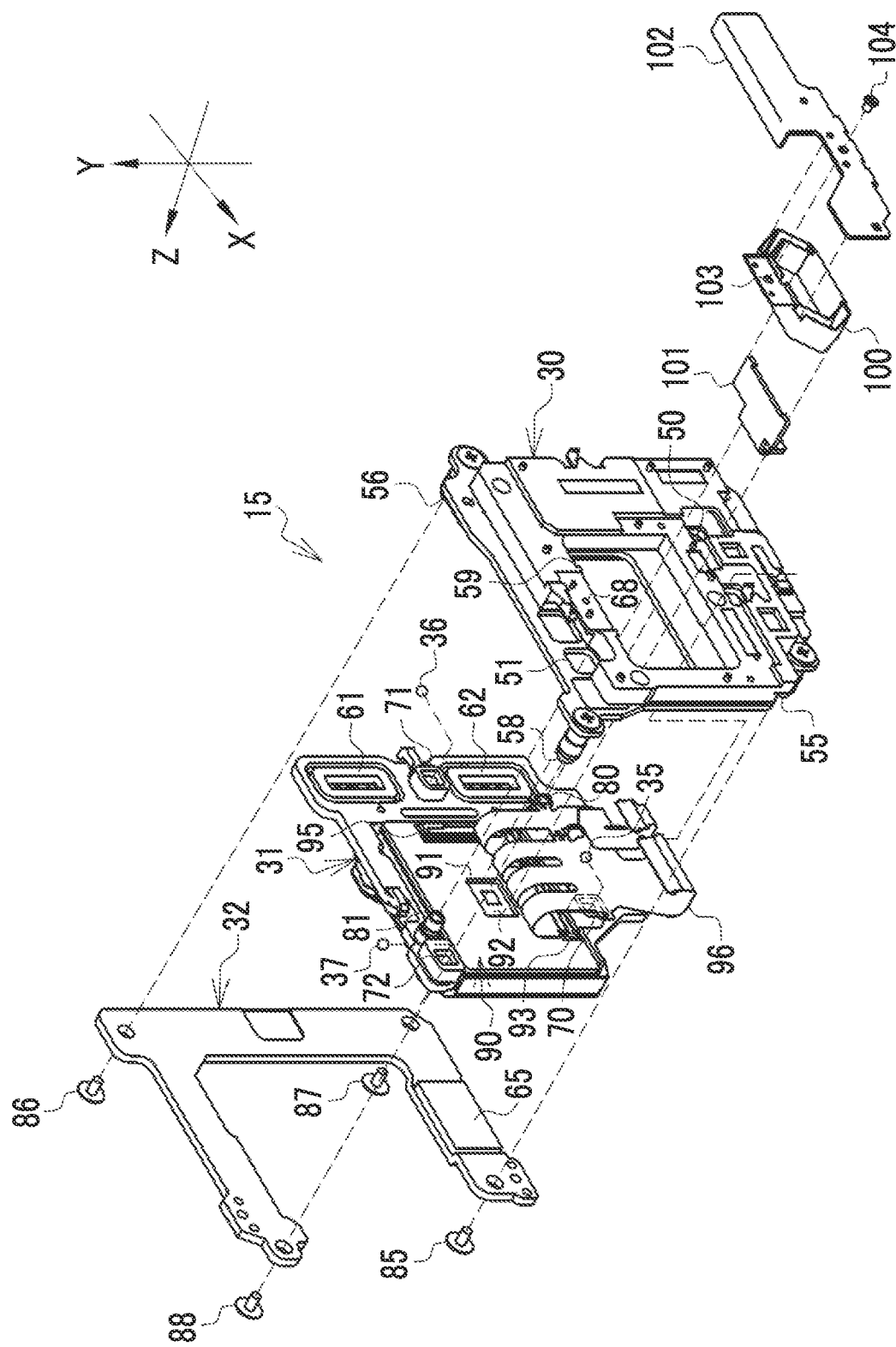
FIG. 3 is a rear exploded perspective view of the imaging element unit.

In FIGS. 2 and 3, the imaging element unit 15 comprises a fixing member 30, a movable member 31, a yoke 32, and the like. The fixing member 30 is disposed on a rear side of the camera body 10, and the yoke 32 is disposed on a front side of the camera body 10. The fixing member 30 is fixed to the camera body 10. Further, the fixing member 30 and the yoke 32 are fixed at an interval in a Z-axis direction that is perpendicular to an X axis and a Y axis. The movable member 31 is disposed between the fixing member 30 and the yoke 32 via three balls 35, 36, and 37 having the same size. The movable member 31 can be moved in the X-axis direction and the Y-axis direction (rotated about a Z axis) with respect to the fixing member 30 and the yoke 32 by the balls 35 to 37. The Z axis is parallel to the optical axis OA obtained in a case where misregistration does not occur yet.

The fixing member 30 holds a magnet 40, a magnet 41, and a magnet 42. The magnets 40 to 42 are mounted on a front surface of the fixing member 30 facing the movable member 31. Each of the magnets 40 to 42 is a set of a sheet-like magnet of which an N pole faces the movable member 31 and a sheet-like magnet of which an S pole faces the movable member 31. The magnet 40 is disposed in the middle of a lower portion of the fixing member 30 such that a long side of the magnet 40 is parallel to the X-axis direction. The magnet 41 and the magnet 42 are arranged in the Y-axis direction. The magnet 41 is disposed at an upper left corner of the fixing member 30 such that a long side of the magnet 41 is parallel to the Y-axis direction. The magnet 42 is disposed at a lower left corner of the fixing member 30 such that a long side of the magnet 42 is parallel to the Y-axis direction.

A plate 45, a plate 46, and a plate 47 are mounted on the front surface of the fixing member 30 in addition to the magnets 40 to 42. The plate 45 is disposed above the magnet 40 at a lower right corner of the fixing member 30. The plate 46 is disposed between the magnets 41 and 42 on the left side of the fixing member 30. The plate 47 is disposed at an upper right corner of the fixing member 30. The plate 45 supports the ball 35 such that the ball 35 can roll, the plate 46 supports the ball 36 such that the ball 36 can roll, and the plate 47 supports the ball 37 such that the ball 37 can roll.

A square restriction opening 50 and a square restriction opening 51, which restrict the movement range of the movable member 31 in an XY plane, are formed in the fixing member 30. The sizes of the restriction openings 50 and 51, which are viewed in a plan view in the Z-axis direction, are substantially the same. The restriction opening 50 is formed between the magnet 42 and the plate 45 at the lower left corner of the fixing member 30. The restriction opening 51 is formed at the upper right corner of the fixing member 30 to be adjacent to the left side of the plate 47. That is, the restriction openings 50 and 51 are disposed at substantially diagonal positions in the fixing member 30.

A female screw 55, a female screw 56, a female screw 57, and a female screw 58 are provided on the fixing member 30 via spacers. The female screw 55 is provided at the lower right corner of the fixing member 30. The female screw 56 is provided at the upper left corner of the fixing member 30. The female screw 57 is provided at the lower left corner of the fixing member 30. The female screw 58 is provided at the upper right corner of the fixing member 30.

A relatively large rectangular access opening 59 is formed at a central portion of the fixing member 30. The access opening 59 is provided for access to the back surface of the movable member 31 from the back surface of the fixing member 30.

The movable member 31 holds the imaging element 16, and holds a coil 60, a coil 61, and a coil 62. The imaging element 16 is disposed at a central portion of the movable member 31. The coil 60 is disposed at a position facing the magnet 40 in the Z-axis direction in the middle of a lower portion of the movable member 31. The coil 61 is disposed at a position facing the magnet 41 in the Z-axis direction at an upper left corner of the movable member 31. The coil 62 is disposed at a position facing the magnet 42 in the Z-axis direction at a lower left corner of the movable member 31. The coil 60 is disposed such that a long side of the coil 60 is parallel to the X-axis direction. The coils 61 and 62 are arranged in the Y-axis direction. Each of the coils 61 and 62 is disposed such that a long side of each of the coils 61 and 62 is parallel to the Y-axis direction.

A magnet 65 is held by the yoke 32. Further, a magnetic body 66 is mounted on the coil 61, and a magnetic body 67 is mounted on the coil 62. The magnet 65 is, for example, a neodymium magnet. The magnetic bodies 66 and 67 are, for example, thin plate pieces made of iron. The magnet 65 is disposed to cover the coil 60, and increases a drive force of the coil 60. The magnetic bodies 66 and 67 are arranged in the Y-axis direction. The magnetic body 66 is disposed on the upper end side of the coil 61, and the magnetic body 67 is disposed on the lower end side of the coil 62.

Since the coil 60 is disposed at a position facing the magnet 40 in the Z-axis direction as described above, the magnet 65 is also disposed at a position facing the magnet 40 in the Z-axis direction. For this reason, the magnet 65 is attracted to the magnet 40 in a state where the magnet 65 is fixed to the yoke 32.

Likewise, since the coil 61 is disposed at a position facing the magnet 41 in the Z-axis direction as described above, the magnetic body 66 is also disposed at a position facing the magnet 41 in the Z-axis direction. For this reason, the magnetic body 66 is attracted to the magnet 41. Further, since the coil 62 is disposed at a position facing the magnet 42 in the Z-axis direction as described above, the magnetic body 67 is also disposed at a position facing the magnet 42 in the Z-axis direction. For this reason, the magnetic body 67 is attracted to the magnet 42.

A recessed portion 70, a recessed portion 71, and a recessed portion 72 are formed on a rear surface of the movable member 31 facing the fixing member 30. The recessed portion 70 is disposed at a position facing the plate 45 in the Z-axis direction at a lower right corner of the movable member 31. The recessed portion 71 is disposed at a position facing the plate 46 in the Z-axis direction between the coils 61 and 62 provided on the left side of the movable member 31. The recessed portion 72 is disposed at a position facing the plate 47 in the Z-axis direction at an upper right corner of the movable member 31. The recessed portion 70 houses the ball 35 such that the ball 35 can roll, the recessed portion 71 houses the ball 36 such that the ball 36 can roll, and the recessed portion 72 houses the ball 37 such that the ball 37 can roll. The sizes of the recessed portions 70 to 72, which are viewed in a plan view in the Z-axis direction, are slightly larger than the diameters of the balls 35 to 37, respectively. Further, the depths of the recessed portions 70 to 72 in the Z-axis direction are slightly smaller than the diameters of the balls 35 to 37, respectively.

A columnar protrusion 80, which protrudes toward the fixing member 30, is provided on the rear surface of the movable member 31 at a position facing the restriction opening 50 in the Z-axis direction. Further, a columnar protrusion 81, which protrudes toward the fixing member 30, is provided on the rear surface of the movable member 31 at a position facing the restriction opening 51 in the Z-axis direction. The protrusion 80 is inserted into the restriction opening 50. Further, the protrusion 81 is inserted into the restriction opening 51. For this reason, the protrusions 80 and 81 act as restriction pins that restrict the movement of the movable member 31 in the XY plane.

The yoke 32 is, for example, a magnetic body, such as a thin plate made of iron, and has a substantially C-shape. The yoke 32 forms a magnetic circuit together with the magnets 40 to 42, and increases magnetic flux that is received by the coils 60 to 62.

A male screw 85, a male screw 86, a male screw 87, and a male screw 88 are mounted on the yoke 32. The male screws 85 to 88 are fastened and fixed to the female screws 55 to 58 of the fixing member 30. Accordingly, the fixing member 30 and the yoke 32 are fixed to each other and the movable member 31 is movably held between the fixing member 30 and the yoke 32.

The imaging element unit 15 comprises a pair of voice coil motors (VCMs). The pair of VCMs is a pair formed of a first VCM and a second VCM. The first VCM comprises a pair formed of the magnet 40 and the coil 60 and the yoke 32, and generates power that is used to move the movable member 31 in the Y-axis direction. On the other hand, the second VCM comprises a pair formed of the magnet 41 and the coil 61, a pair formed of the magnet 42 and the coil 62, and the yoke 32, and generates power that is used to move the movable member 31 in the X-axis direction. More specifically, the first VCM generates power that is used to move the movable member 31 in the Y-axis direction with a magnetic force of the magnet 40 and a current flowing through the coil 60. Further, the second VCM generates power that is used to move the movable member 31 in the X-axis direction with a magnetic force of the magnet 41, a current flowing through the coil 61, a magnetic force of the magnet 42, and a current flowing through the coil 62.

Although not shown, the movable member 31 is provided with a hall element that detects a position of the movable member 31, a temperature sensor that measures a temperature around the hall element, and the like. The CPU 18 takes a difference between a position of the movable member 31 that is detected by the hall element and a target position of the movable member 31 that is used to correct misregistration, and performs a feedback control for driving the VCMs to eliminate the difference. In a case where the difference is large, the power generated by the VCMs is relatively increased. Conversely, in a case where the difference is small, the power generated by the VCMs is relatively reduced. Further, the CPU 18 corrects the temperature drift of the hall element using the temperature that is measured by the temperature sensor.

Figure 4:
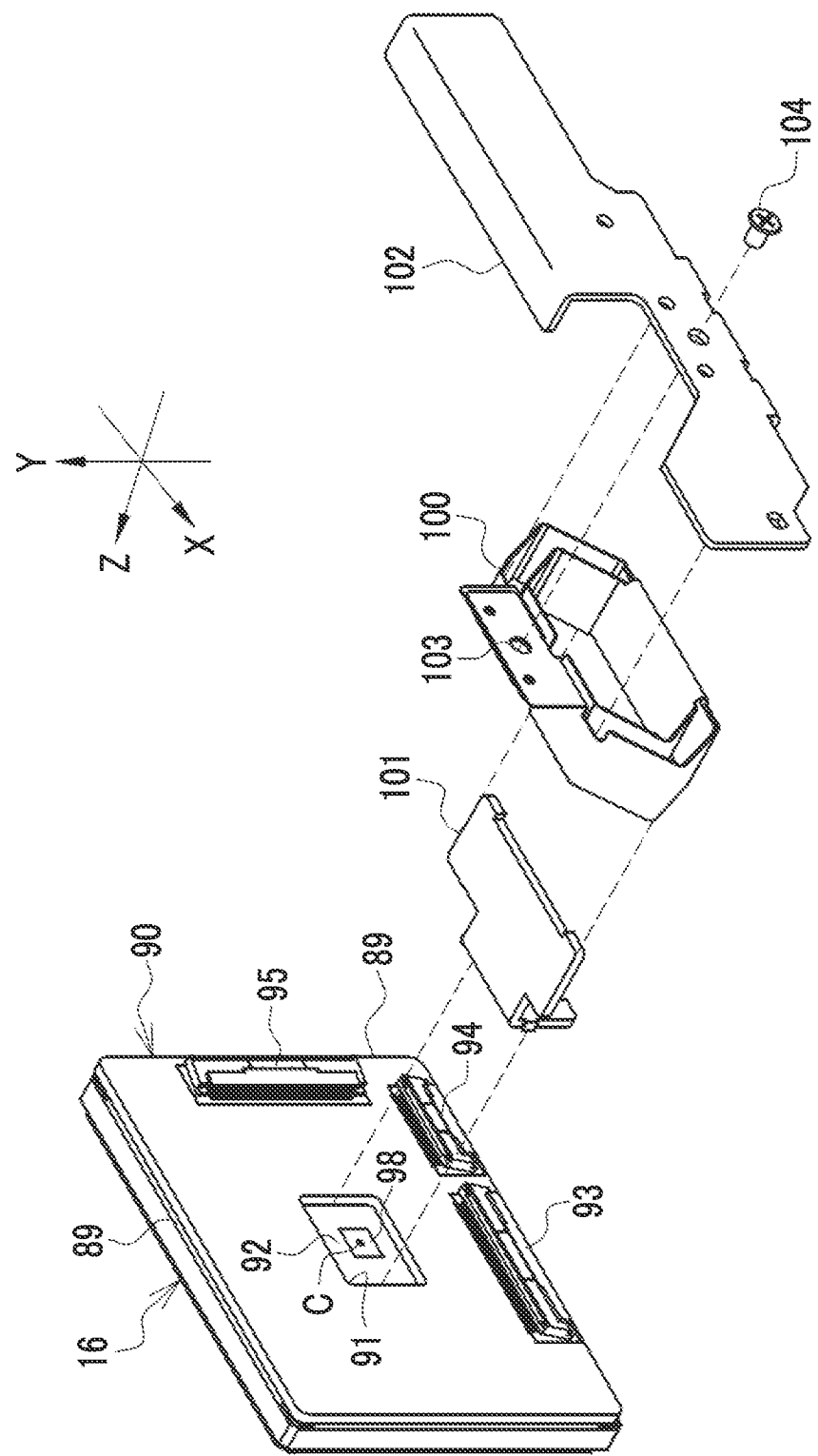
FIG. 4 is a rear exploded perspective view of a main part of the imaging element unit.

As also shown in FIG. 4, a rectangular plate-like circuit board 90 having substantially the same size as the imaging element 16 is mounted on a back surface 89 of the imaging element 16 opposite to the imaging surface 17. The circuit board 90 is made of a resin, such as epoxy. A rectangular opening 91 is formed in the circuit board 90. The opening 91 is formed at a central portion of the circuit board 90, and causes a central region 92 of the back surface 89 of the imaging element 16 to be exposed therethrough. The central region 92 is a region that has a center point C of the back surface 89 of the imaging element 16 as a center, surrounds the center point C, and has a preset size. Identification information 98 of the imaging element 16 is written in the central region 92. The opening 91 is formed for the visual recognition of the identification information 98. The identification information 98 is, for example, a two-dimensional bar code that is used to move to an internet page in which a management number or management information is written. The central region 92 is an example of "a part of the back surface" according to the technique of the present disclosure.

Electric circuits, such as a control circuit, a drive circuit, and a power source circuit for the imaging element 16, are mounted on the circuit board 90. A connector 93 and a connector 94 are provided at a lower end of a back surface of the circuit board 90. Further, a connector 95 is provided at a left end of the back surface of the circuit board 90.

One end of a flexible board 96 is connected to the connectors 93 and 94. The other end of the flexible board 96 is led out to the back surface side of the fixing member 30 through the access opening 59 (see FIG. 7). The other end of the flexible board 96 is connected to the CPU 18, a power feed circuit (not shown) that feeds power from a battery, and the like. Further, one end of a flexible board 97 (see FIG. 1) is connected to the connector 95. The other end of the flexible board 97 wraps around a front surface of the movable member 31 and is connected to the imaging element 16. In summary, the other end of the flexible board 97 is connected to the imaging element 16, and one end of the flexible board 97 is connected to the connector 95. Further, one end of the flexible board 96 is connected to the connectors 93 and 94, and the CPU 18 and the like are connected to the other end of the flexible board 96. For this reason, the imaging element 16, the circuit board 90, the CPU 18, and the like are connected via the flexible board 97, the connectors 95, 93, and 94, and the flexible board 96.

The imaging element unit 15 further includes a first heat conductive member 100, a second heat conductive member 101, and a third heat conductive member 102 to which driving heat of the imaging element 16 is conducted.

The second heat conductive member 101 and the third heat conductive member 102 are connected to the first heat conductive member 100. Driving heat is conducted to the first heat conductive member 100 from the second heat conductive member 101. Further, the first heat conductive member 100 conducts driving heat to the third heat conductive member 102. The second heat conductive member 101 is connected to the central region 92 of the back surface 89 of the imaging element 16 that is exposed through the opening 91. Driving heat is conducted to the second heat conductive member 101 from the central region 92.

The first heat conductive member 100 and the second heat conductive member 101 are fixed to each other by an adhesive. A female screw 68 is formed in the fixing member 30. An insertion hole 103 is formed in the first heat conductive member 100. A male screw 104 is mounted on the third heat conductive member 102. The male screw 104 passes through the insertion hole 103 of the first heat conductive member 100, and is fastened and fixed to the female screw 68 of the fixing member 30. Accordingly, the first heat conductive member 100 and the third heat conductive member 102 are fixed.

The first heat conductive member 100 is formed of a graphite sheet. The graphite sheet has a configuration in which a graphite sheet body is pouched with a resin film, such as a polyethylene terephthalate (PET) film. The thickness of the graphite sheet body is, for example, 70 μm and the thickness of the resin film is, for example, 5 μm.

Each of the second heat conductive member 101 and the third heat conductive member 102 is a metal plate, for example, a copper plate. For this reason, the second heat conductive member 101 and the third heat conductive member 102 have stiffness higher than the stiffness of the first heat conductive member 100 formed of a graphite sheet. In other words, the first heat conductive member 100 has elasticity higher than the elasticity of the second heat conductive member 101 and the third heat conductive member 102.

Figure 5:
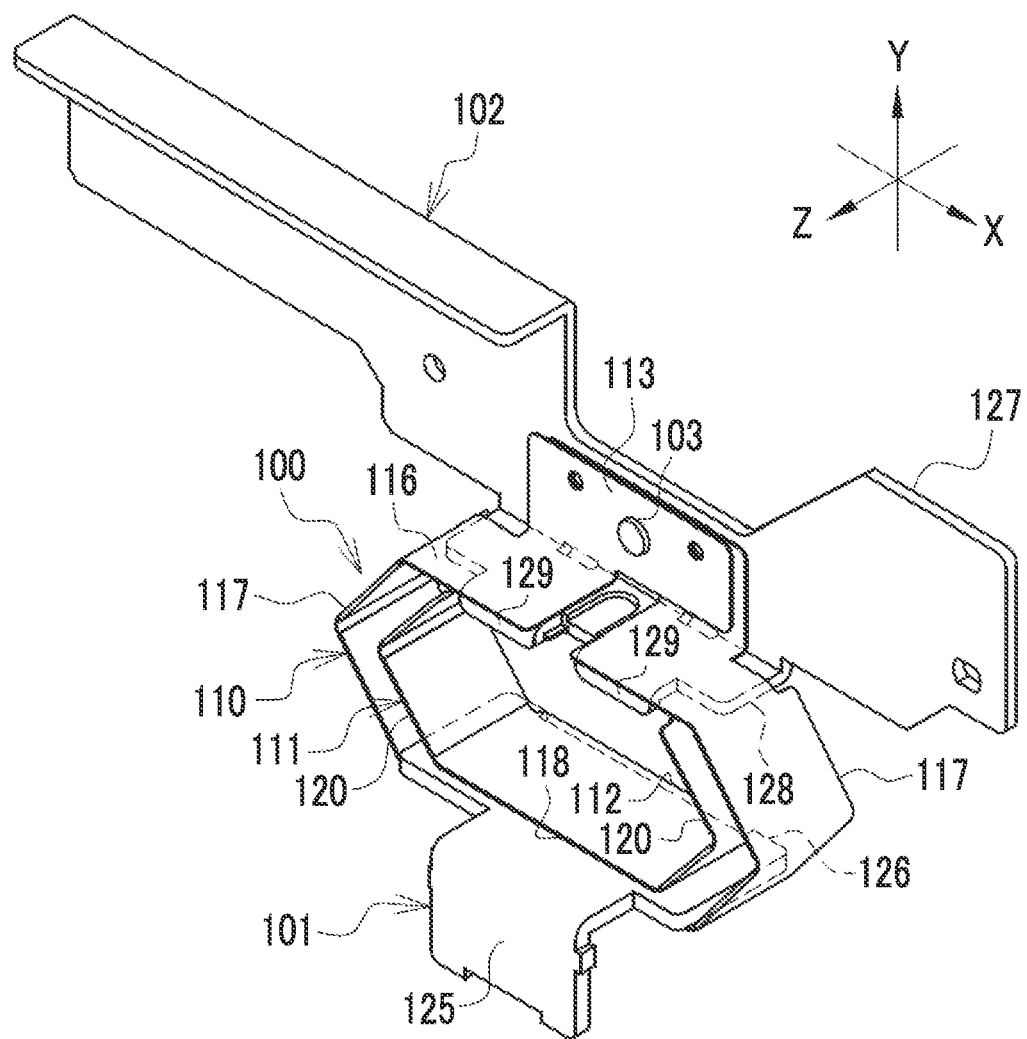
FIG. 5 is a perspective view of a first heat conductive member, a second heat conductive member, and a third heat conductive member.
Figure 6:
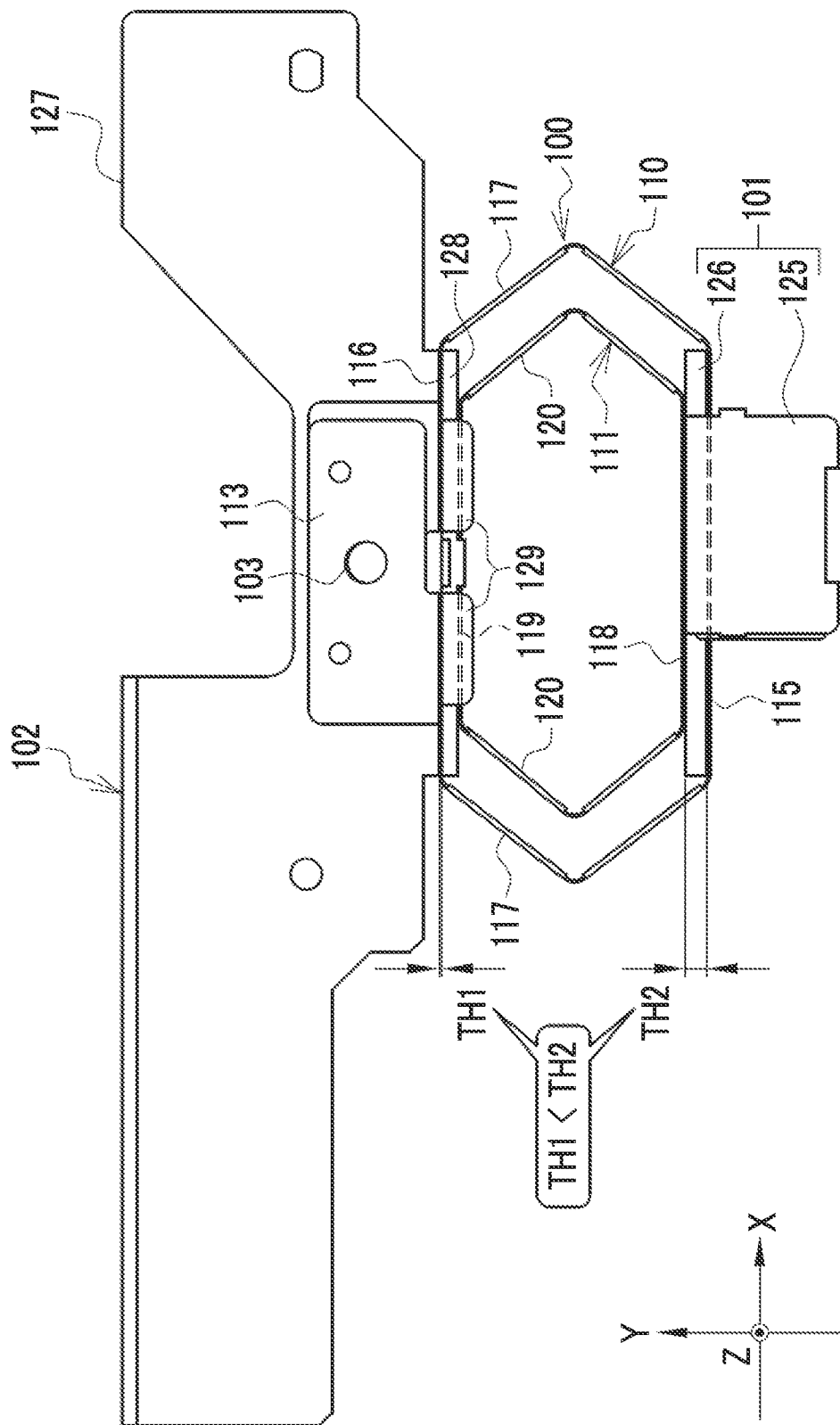
FIG. 6 is a plan view of the first heat conductive member, the second heat conductive member, and the third heat conductive member.

For example, as shown in FIGS. 5 and 6, the first heat conductive member 100 has a double-layered structure that includes an outer layer portion 110 and an inner layer portion 111. The inner layer portion 111 is connected to the outer layer portion 110 via a connecting portion 112 (also see FIG. 9 and the like), and is disposed in a space surrounded by the outer layer portion 110. A mounting portion 113 in which the insertion hole 103 is formed is provided at an upper portion of the outer layer portion 110.

Both the outer layer portion 110 and the inner layer portion 111 have a hexagonal shape. The outer layer portion 110 includes a first sheet portion 115, a second sheet portion 116 that has the same length as the first sheet portion 115 and faces the first sheet portion 115, and a pair of V-shaped connecting portions 117 that connects the first sheet portion 115 and the second sheet portion 116. Likewise, the inner layer portion 111 includes a first sheet portion 118, a second sheet portion 119 that has the same length as the first sheet portion 118 and faces the first sheet portion 118, and a pair of V-shaped connecting portions 120 that connects the first sheet portion 118 and the second sheet portion 119. The first and second sheet portions 115 and 116 and the first and second sheet portions 118 and 119 have a planar shape.

The second heat conductive member 101 includes a first piece 125 and a second piece 126. The first piece 125 is parallel to the imaging surface 17 and the back surface 89 of the imaging element 16, and faces the back surface 89 of the imaging element 16. The first piece 125 is connected to the central region 92 of the back surface 89. The second piece 126 is bent from the first piece 125 at an angle of 90°, and extends in a normal direction of the imaging surface 17 and the back surface 89 of the imaging element 16. The normal direction of the imaging surface 17 and the back surface 89 of the imaging element 16 is, that is, the Z-axis direction (a direction of the optical axis OA obtained in a case where misregistration does not occur yet). The second piece 126 has substantially the same size as a space between the first sheet portion 115 of the outer layer portion 110 and the first sheet portion 118 of the inner layer portion 111.

The second heat conductive member 101 is connected to the first heat conductive member 100 via the second piece 126. More specifically, the second piece 126 is inserted into the space between the first sheet portion 115 of the outer layer portion 110 and the first sheet portion 118 of the inner layer portion 111, and is held in a state where the second piece 126 is sandwiched between the first sheet portions 115 and 118. A double-sided tape is attached to portions of the first sheet portions 115 and 118 that are in contact with the second piece 126. The first sheet portions 115 and 118 and the second piece 126 are fixed to each other, eventually, the first heat conductive member 100 and the second heat conductive member 101 are fixed to each other, by the adhesive of the double-sided tape.

The third heat conductive member 102 includes a first piece 127 and a second piece 128. The first piece 127 is parallel to the imaging surface 17 and the back surface 89 of the imaging element 16 as with the first piece 125 of the second heat conductive member 101, and has the shape of a wing long in the X-axis direction. As with the second piece 126 of the second heat conductive member 101, the second piece 128 is bent from the first piece 127 at an angle of 90° and extends in the normal direction of the imaging surface 17 and the back surface 89 of the imaging element 16.

The third heat conductive member 102 is connected to the first heat conductive member 100 via the second piece 128. More specifically, the second piece 128 is inserted into the space between the second sheet portion 116 of the outer layer portion 110 and the second sheet portion 119 of the inner layer portion 111, and is held in a state where the second piece 128 is sandwiched between the second sheet portions 116 and 119. The second piece 128 is provided with claws 129 that are caught by an edge of the second sheet portion 119.

A thickness TH2 of the second heat conductive member 101 is larger than a thickness TH1 of the first heat conductive member 100. The thickness TH1 of the first heat conductive member 100 is, for example, 80 μm and the thickness of the second heat conductive member 101 is, for example, 1 mm. Although not shown, a thickness of the third heat conductive member 102 is also larger than the thickness TH1 of the first heat conductive member 100 and is, for example, 1 mm.

Figure 7:
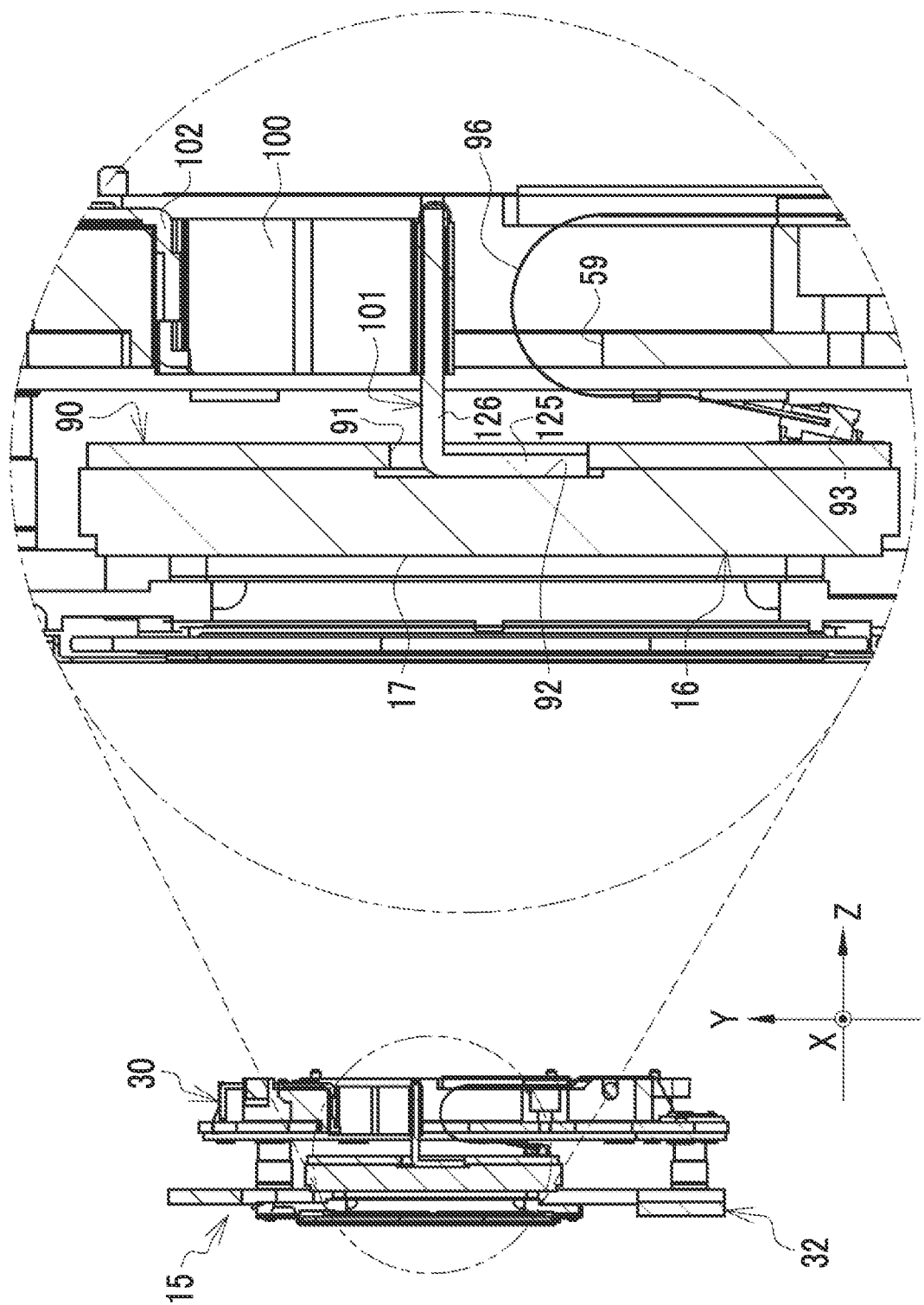
FIG. 7 is a cross-sectional view of a main part of the imaging element unit.

For example, as shown in FIG. 7, the flexible board 96 led out through the access opening 59 is disposed on one side of the second piece 126 of the second heat conductive member 101 opposite to the first heat conductive member 100.

Figure 8:
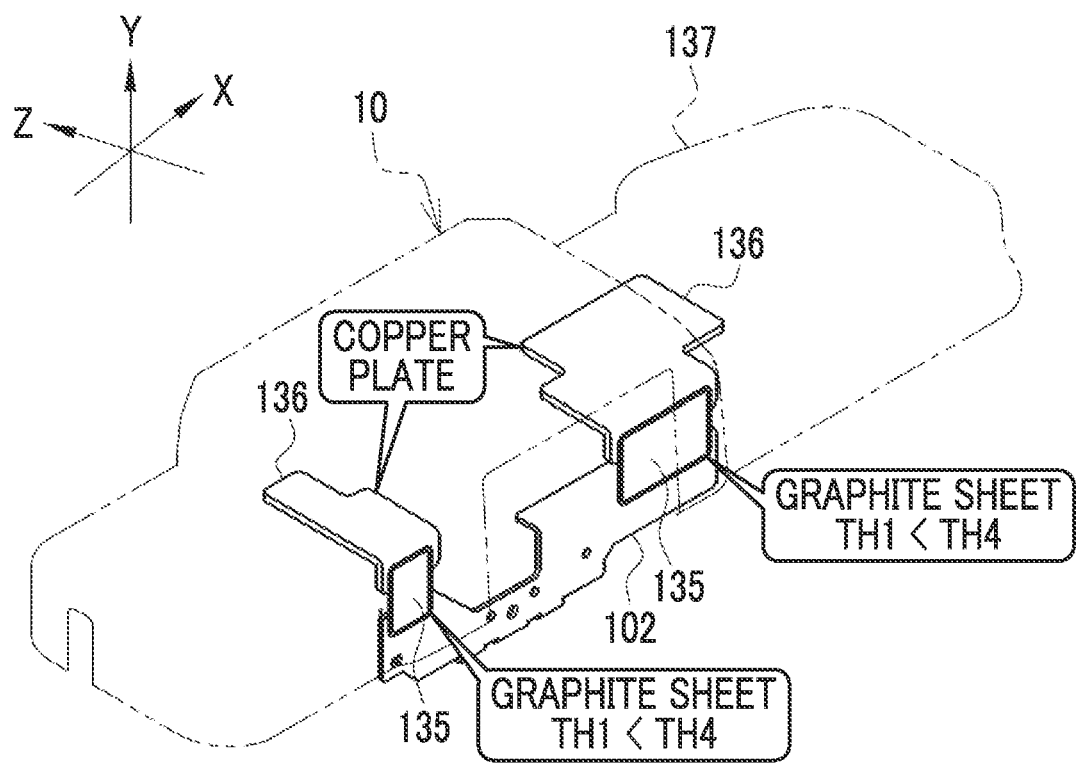
FIG. 8 is a perspective view of the third heat conductive member, fourth heat conductive members, and a connecting member.

For example, as shown in FIG. 8, fourth heat conductive members 135 are mounted on the third heat conductive member 102 by an adhesive. Each of the fourth heat conductive members 135 is formed of a graphite sheet as with the first heat conductive member 100. A thickness TH4 of the fourth heat conductive member 135 is larger than the thickness TH1 (see FIG. 6) of the first heat conductive member 100. The thickness TH4 of the fourth heat conductive member 135 is, for example, 500 μm.

A connecting member 136 is further mounted on each of the fourth heat conductive members 135 by an adhesive. Each of the connecting members 136 is a metal plate, for example, a copper plate as with the second heat conductive member 101 and the third heat conductive member 102. The connecting members 136 are connected to a top plate 137 of the camera body 10. The top plate 137 of the camera body 10 is, for example, a magnesium plate or an aluminum plate.

Figure 9:
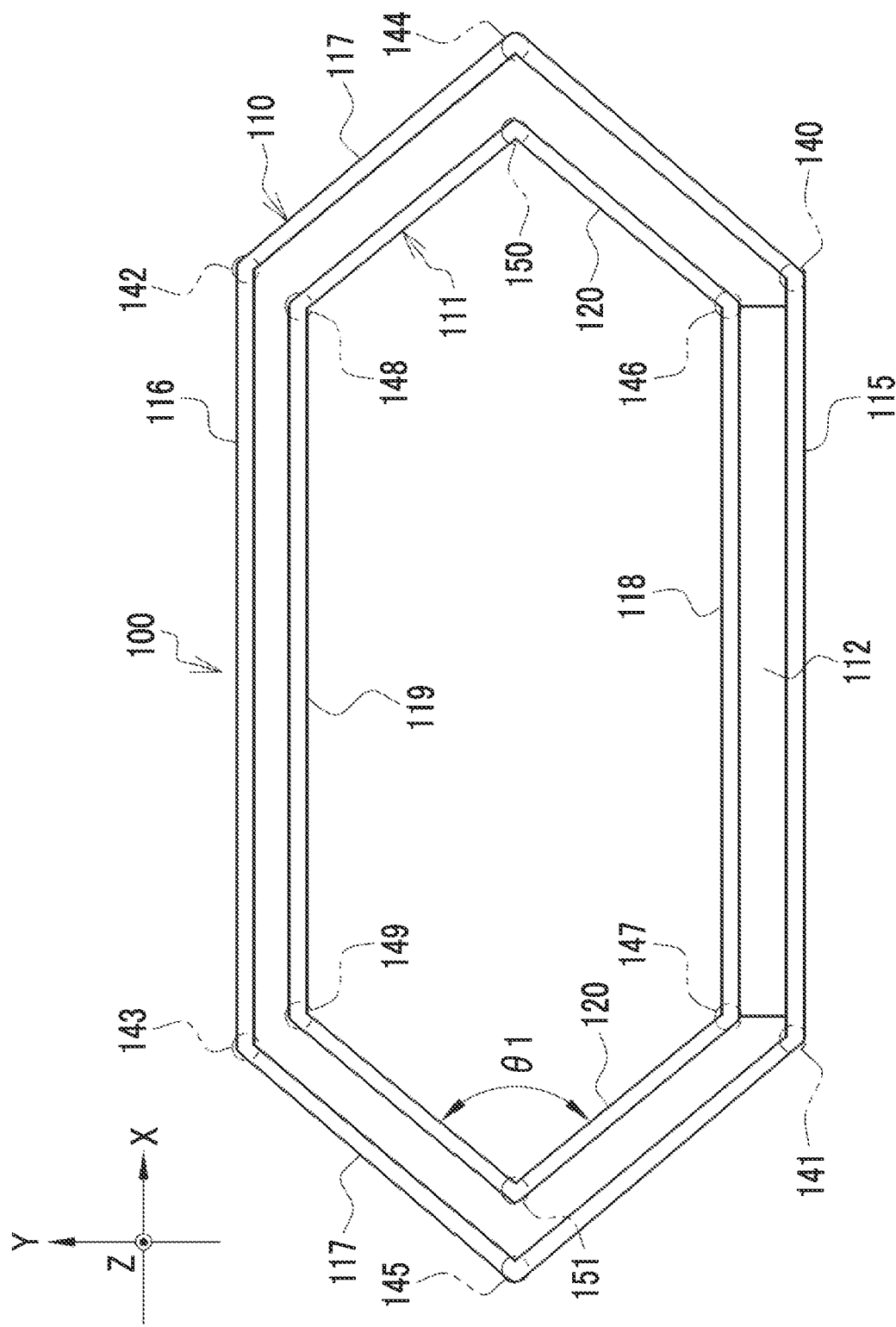
FIG. 9 is a simple plan view of the first heat conductive member.

For example, as shown in FIG. 9, the outer layer portion 110 of the first heat conductive member 100 has six corners 140, 141, 142, 143, 144, and 145 since having a hexagonal shape as described above. The inner layer portion 111 has six corners 146, 147, 148, 149, 150, and 151 since also having a hexagonal shape. The corners 140 to 145 and the corners 146 to 151 function as bent portions that allow the first heat conductive member 100 to be deformable to follow the movement of the imaging element 16 caused by the anti-vibration function. The corners 140 to 145 protrude outward. Likewise, the corners 146 to 151 also protrude outward. That is, the first heat conductive member 100 has the shape of a pantograph. The mounting portion 113 is not shown in FIG. 9 to simplify the first heat conductive member 100. The same applies to FIGS. 11, 12, and the like.

For example, broken line portions of one sheet-like material 160 are bent as shown in FIG. 10, so that the first heat conductive member 100 is formed. Specifically, first, a portion corresponding to the connecting portion 112 is bent such that a portion corresponding to the outer layer portion 110 and a portion corresponding to the inner layer portion 111 face each other. Then, after portions corresponding to the corners 146 to 151 are bent to form the inner layer portion 111, portions corresponding to the corners 140 to 145 are bent to form the outer layer portion 110. Finally, a portion corresponding to the mounting portion 113 is bent to complete the first heat conductive member 100.

The first heat conductive member 100 includes a reinforcing layer 161. The reinforcing layer 161 is a resin film, for example, a PET film having a thickness of 40 μm. The reinforcing layer 161 is provided on two sides that form each of the connecting portions 117 and the connecting portions 120, and is not provided on the corners 144, 145, 150, and 151 functioning as bent portions. As a matter of course, each of the two sides, which form each of the connecting portions 117 and 120, is thicker than each of the corners 144, 145, 150, and 151, which function as the bent portions, by the thickness of the reinforcing layer 161.

Figure 11:
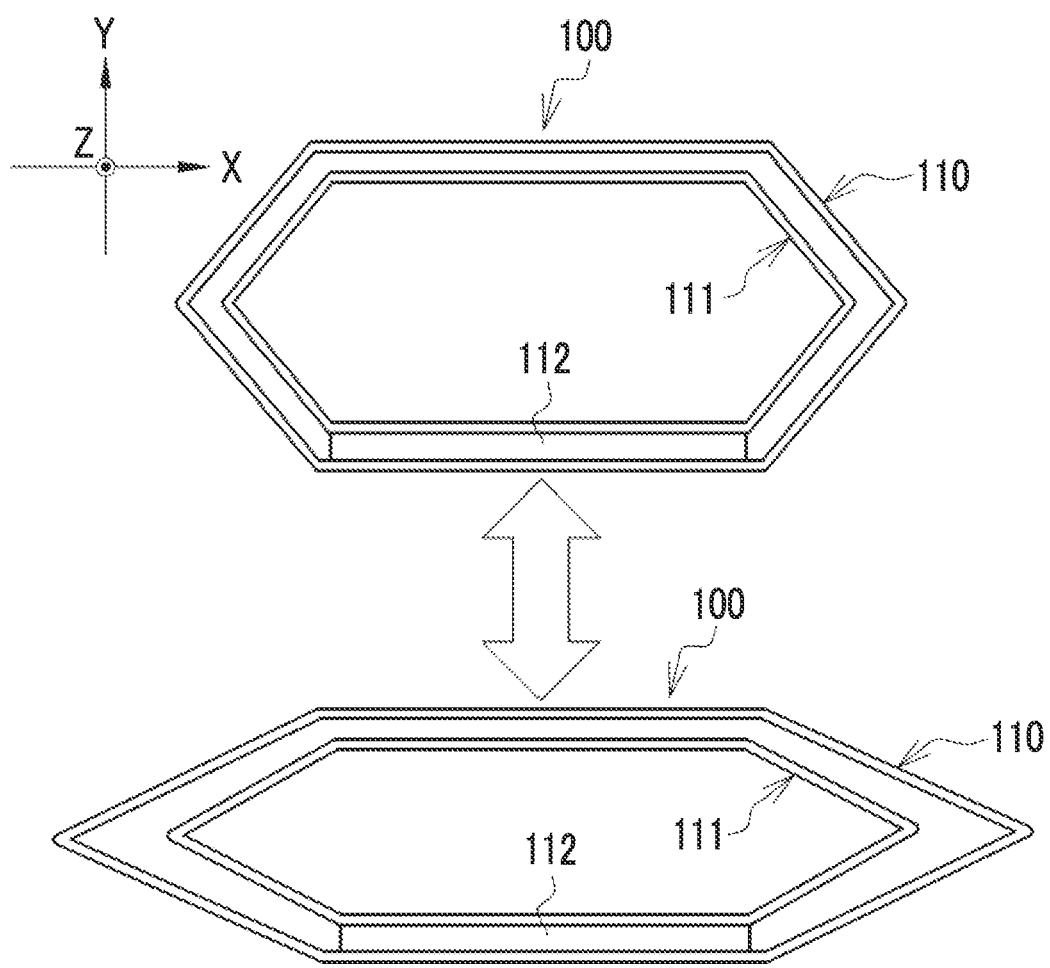
FIG. 11 is a diagram showing an aspect in which the first heat conductive member is deformed.
Figure 12:
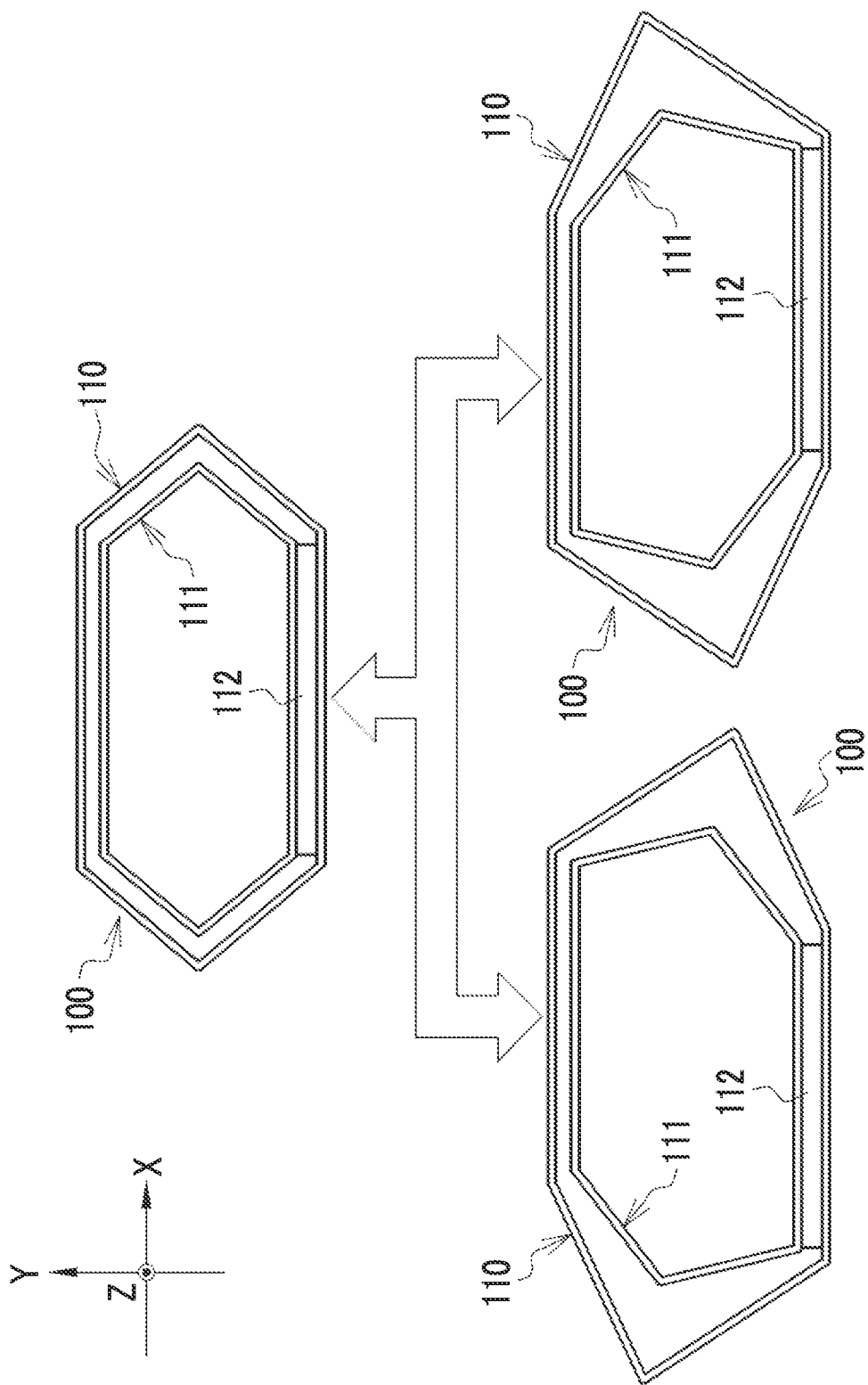
FIG. 12 is a diagram showing an aspect in which the first heat conductive member is deformed.

For example, as shown in FIGS. 11 and 12, the first heat conductive member 100 is deformed to be capable of following the movement of the imaging element 16 caused by the anti-vibration function. FIG. 11 shows an aspect in which the first heat conductive member 100 is flexibly deformed in a vertical direction to follow the movement of the imaging element 16 in the Y-axis direction caused by the anti-vibration function. FIG. 12 shows an aspect in which the first heat conductive member 100 is tilted and deformed in a horizontal direction to follow the movement of the imaging element 16 in the X-axis direction caused by the anti-vibration function.

Next, an action obtained from the above-mentioned configuration will be described. In the digital camera 2, driving heat that cannot be ignored is generated in the imaging element 16 in a case where imaging in which a relatively large load is applied to the imaging element 16, such as taking a video with a frame rate of 120 frames per second and an image quality equivalent to a resolution of 4K (4K/120p), is performed.

Figure 13:
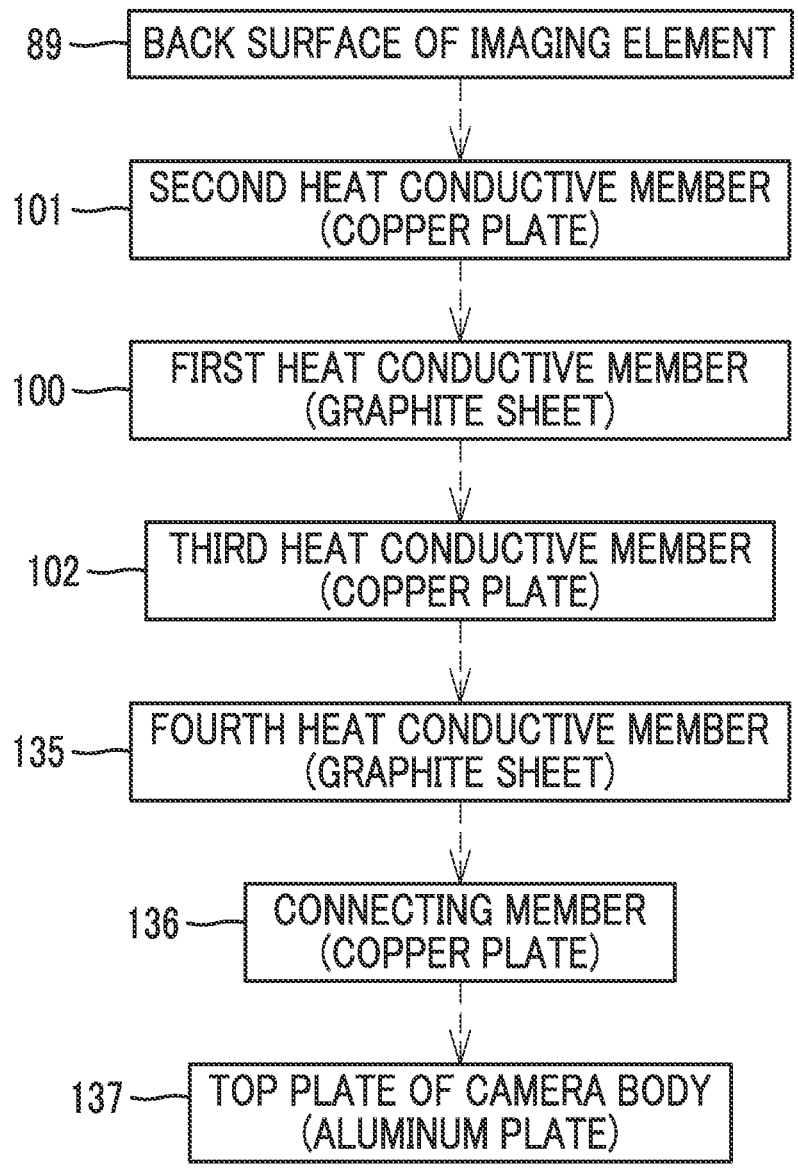
FIG. 13 is a diagram showing a conduction path of driving heat of the imaging element.

In the imaging element unit 15 of this example, the driving heat of the imaging element 16 is conducted along a conduction path shown in FIG. 13. That is, the driving heat of the imaging element 16 is conducted to the second heat conductive member 101, which is connected to the central region 92 of the back surface 89, from the back surface 89 of the imaging element 16 first. After that, the driving heat is conducted to the first heat conductive member 100, which is connected via the second piece 126 of the second heat conductive member 101, from the second heat conductive member 101.

The driving heat conducted to the first heat conductive member 100 is conducted to the third heat conductive member 102 that is connected via the second piece 128. In addition, the driving heat is conducted to the fourth heat conductive members 135 from the third heat conductive member 102 and is conducted to the connecting members 136 from the fourth heat conductive members 135. Then, the driving heat is conducted to the top plate 137 of the camera body 10 via the connecting members 136, and is dissipated to the outside via the top plate 137.

The imaging element unit 15 is adapted such that the movable member 31 is movable with respect to the fixing member 30 and the yoke 32. The movable member 31 holds the imaging element 16. For this reason, as the movable member 31 is moved, the imaging element 16 is also moved. In a case where the misregistration of subject light incident on the imaging surface 17 occurs due to a camera shake caused by a user, the movable member 31, eventually, the imaging element 16 is moved under the control of the CPU 18 in a direction in which the misregistration is canceled by a distance that is required to cancel the misregistration. As shown in FIGS. 11 and 12, the first heat conductive member 100 is deformed to follow the movement of the imaging element 16 caused by the anti-vibration function.

As described above, the imaging element unit 15 comprises the imaging element 16 that includes the imaging surface 17 for imaging a subject and the back surface 89 opposite to the imaging surface 17, the circuit board 90 that is mounted on the back surface 89, and the first heat conductive member 100 and the second heat conductive member 101 to which driving heat of the imaging element 16 is conducted. The opening 91, which causes the central region 92 of the back surface 89 of the imaging element 16 to be exposed therethrough, is formed in the circuit board 90. The first heat conductive member 100 is connected to the second heat conductive member 101, and has elasticity higher than the elasticity of the second heat conductive member 101. The second heat conductive member 101 is connected to the back surface 89 via the opening 91. Since the second heat conductive member 101 that has relatively high stiffness and is not easily deformed is directly connected to the imaging element 16, it is possible to make it difficult for the heat conductive member to be peeled off from the imaging element 16 as compared to a case where the first heat conductive member 100 that has relatively high elasticity and is easily deformed is directly connected to the imaging element 16.

The imaging element unit 15 has an anti-vibration function that moves the imaging element 16 in the plane directions. As shown in FIGS. 11 and 12, the first heat conductive member 100 is deformed to follow the movement of the imaging element 16 caused by the anti-vibration function. For this reason, an effect of making it difficult for the heat conductive member to be peeled off, which is obtained since the second heat conductive member 101 that has relatively high stiffness and is not easily deformed is directly connected to the imaging element 16, can be further exhibited.

Further, in a case where the first heat conductive member 100 is directly connected to the imaging element 16, it is necessary to increase the thickness TH1 of the first heat conductive member 100 to increase conduction efficiency. In a case where the thickness TH1 is large, a repulsive force of the first heat conductive member 100 is increased as much as that and the deformation of the first heat conductive member 100 following the movement of the imaging element 16 caused by the anti-vibration function is less likely to occur. However, in this example, it is not necessary to increase the thickness TH1 of the first heat conductive member 100 so much. For this reason, the first heat conductive member 100 can be deformed without a large resistance to follow the movement of the imaging element 16 caused by the anti-vibration function as compared to a case where the first heat conductive member 100 is directly connected to the imaging element 16.

As shown in FIG. 5 and the like, the second heat conductive member 101 includes the first piece 125 that is connected to the central region 92 and faces the back surface 89, and the second piece 126 that is bent from the first piece 125. The first heat conductive member 100 is connected to the second piece 126. For this reason, the first heat conductive member 100 is deformed to be capable of following not the movement of the imaging element 16 itself but the movement of the second piece 126. In a case where the first heat conductive member 100 is deformed to be capable of following the movement of the imaging element 16 itself, the first heat conductive member 100 needs to have a complicated configuration. However, since the first heat conductive member 100 is deformed to be capable of following the movement of the second piece 126, the first heat conductive member 100 can have a simple configuration.

Further, the second piece 126 extends in the normal direction of the imaging surface 17 and the back surface 89. For this reason, the first heat conductive member 100 can have a simpler configuration. An angle at which the second piece 126 is bent from the first piece 125 may be less than 90° or may be larger than 90°.

The imaging element unit 15 includes the flexible board 96 that is mounted on the circuit board 90. As shown in FIG. 7, the flexible board 96 is disposed on one side of the second piece 126 of the second heat conductive member 101 opposite to the first heat conductive member 100. For this reason, there is no concern that the flexible board 96 and the first heat conductive member 100 are in contact with each other and a signal to the imaging element 16 and/or a signal from the imaging element 16 is disturbed.

As shown in FIG. 6, the thickness TH2 of the second heat conductive member 101 is larger than the thickness TH1 of the first heat conductive member 100. For this reason, the heat conduction efficiency of the second heat conductive member 101 can be increased.

The thermal conductivity of a graphite sheet forming the first heat conductive member 100 is 1600 w/m·K. On the other hand, the thermal conductivity of copper forming the second heat conductive member 101 is 390 W/m·K and is lower than that of the graphite sheet. However, in a case where the thickness TH2 of the second heat conductive member 101 is set to be larger than the thickness TH1 of the first heat conductive member 100 as described above, the lower thermal conductivity of the second heat conductive member 101 can be compensated. Accordingly, the heat conduction efficiency of the second heat conductive member 101 can be made higher than that of the first heat conductive member 100. In a case where the thermal conductivity of the second heat conductive member 101 is higher than that of the first heat conductive member 100, driving heat can be smoothly conducted to the first heat conductive member 100 from the second heat conductive member 101.

The thickness TH2 of the second heat conductive member 101 is increased to make the thermal conductivity of the second heat conductive member 101 higher than the thermal conductivity of the first heat conductive member 100, but the present disclosure is not limited thereto. Instead of or in addition to increasing the thickness TH2 of the second heat conductive member 101, the second heat conductive member 101 may be made of a material having a thermal conductivity higher than the thermal conductivity of the first heat conductive member 100 to make the thermal conductivity of the second heat conductive member 101 higher than the thermal conductivity of the first heat conductive member 100.

As shown in FIG. 4 and the like, the opening 91 of the circuit board 90 causes the central region 92 of the back surface 89 of the imaging element 16 to be exposed therethrough. A portion where the driving heat of the imaging element 16 is highest on the back surface 89 of the imaging element 16 is the central region 92. For this reason, the driving heat of the imaging element 16 can be more effectively dissipated.

Further, the central region 92 is a region in which the identification information 98 of the imaging element 16 is written. For this reason, the opening 91, which is formed for the visual recognition of the identification information 98, can be effectively used for the dissipation of the driving heat of the imaging element 16.

As shown in FIG. 2, the first heat conductive member 100 is formed of a graphite sheet and the second heat conductive member 101 and the third heat conductive member 102 are made of metal. For this reason, the first heat conductive member 100 can be made to have an appropriate elasticity and the second heat conductive member 101 and the third heat conductive member 102 can be made to have an appropriate stiffness.

As shown in FIG. 9 and the like, the first heat conductive member 100 includes the outer layer portion 110 and the inner layer portion 111 that is connected to the outer layer portion 110 and is disposed in a space surrounded by the outer layer portion 110. Each of the outer layer portion 110 and the inner layer portion 111 includes the bent portions (the corners 140 to 145 and the corners 146 to 151) that allow each of the outer layer portion 110 and the inner layer portion 111 to be deformable to follow the movement of the imaging element 16 caused by the anti-vibration function. For this reason, the driving heat of the imaging element 16 can be dissipated more efficiently than in a case where only the outer layer portion 110 is provided. As a result, it is possible to perform imaging in which a relatively large load is applied to the imaging element 16, such as taking of a video of 4K/120p, for a longer period of time than in the related art. Further, since the first heat conductive member 100 has a double-layered structure, it is possible to save an installation space for the heat conductive member.

As shown in FIG. 10, the first heat conductive member 100 is formed of one bent sheet-like material 160. For this reason, the first heat conductive member 100 can be easily formed as compared to a case where the outer layer portion 110 and inner layer portion 111 are formed of separate materials and are then connected to each other.

As shown in FIG. 5 and the like, the first heat conductive member 100 includes the first sheet portion 115 and the first sheet portion 118, the second sheet portion 116 and the second sheet portion 119 that face the first sheet portion 115 and the first sheet portion 118, the connecting portions 117 that connect the first sheet portion 115 and the second sheet portion 116, and the connecting portions 120 that connect the first sheet portion 118 and the second sheet portion 119. For this reason, the first heat conductive member 100 can be deformed without difficulty to follow the movement of the imaging element 16 caused by the anti-vibration function.

Further, as shown in FIG. 9 and the like, the corners 140 to 145 and the corners 146 to 151, which function as bent portions, of the outer layer portion 110 and the inner layer portion 111 protrude outward. For this reason, since a space surrounded by the outer layer portion 110 can be made large, the inner layer portion 111 is easily formed.

As shown in FIG. 10, the first heat conductive member 100 includes the reinforcing layer 161 on two sides that are portions other than the corners 144, 145, 150, and 151 functioning as the bent portions and form each of the connecting portions 117 and 120. Further, each of the two sides forming each of the connecting portions 117 and 120 is thicker than each of the corners 140 to 145 and the corners 146 to 151, which function as the bent portions, by the thickness of the reinforcing layer 161. For this reason, the unintended deformation of the two sides forming each of the connecting portions 117 and 120 can be prevented. Furthermore, since the reinforcing layer 161 is not provided on the corners 140 to 145 and the corners 146 to 151 functioning as the bent portions, the first heat conductive member 100 can be deformed without a large resistance to follow the movement of the imaging element 16 caused by the anti-vibration function. The reinforcing layer 161 may be provided on the first and second sheet portions 115 and 118 and the second sheet portions 116 and 119.

The first heat conductive member 100 is connected to the imaging element 16 via the second heat conductive member 101, and is connected to the camera body 10 via the third heat conductive member 102. As shown in FIG. 5 and the like, the second heat conductive member 101 and the third heat conductive member 102 are sandwiched between the outer layer portion 110 and the inner layer portion 111. For this reason, the conduction efficiency of driving heat conducted to the first heat conductive member 100 from the second heat conductive member 101 and the conduction efficiency of driving heat conducted to the third heat conductive member 102 from the first heat conductive member 100 can be improved. Further, a holding force of the first heat conductive member 100 holding the second heat conductive member 101 and the third heat conductive member 102 can be increased. The third heat conductive member 102 may form a part of the camera body 10.

As shown in FIG. 8, the fourth heat conductive members 135 formed of graphite sheets are connected between the third heat conductive member 102 and the top plate 137 of the camera body 10. The thickness TH4 of the fourth heat conductive member 135 is larger than the thickness TH1 of the first heat conductive member 100. Unlike the first heat conductive member 100, the fourth heat conductive members 135 are not deformed to be capable of following the movement of the imaging element 16 caused by the anti-vibration function. For this reason, it is not necessary to make the thickness TH1 relatively small in order to realize the smooth deformation at the sacrifice of some conduction efficiency of driving heat as in the first heat conductive member 100, and it is possible to ensure sufficient conduction efficiency by making the thickness TH4 large.

Figure 14:
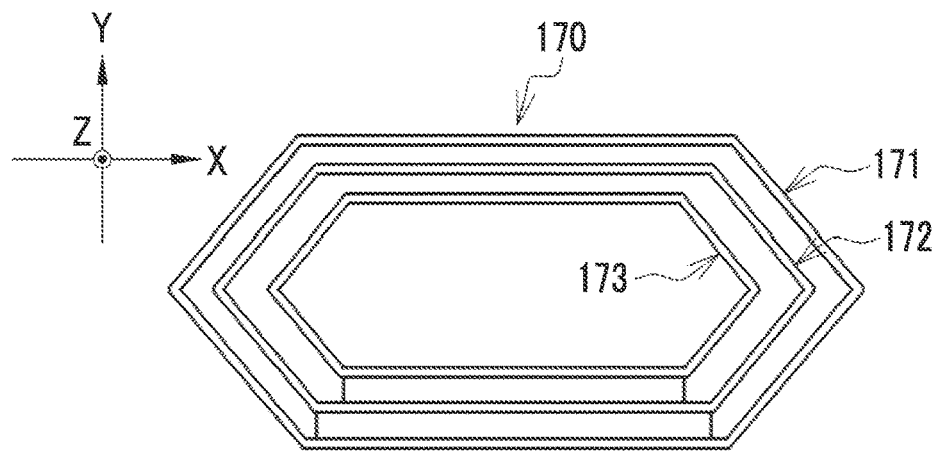
FIG. 14 is a diagram showing a first heat conductive member having a three-layered structure.
Figure 15:
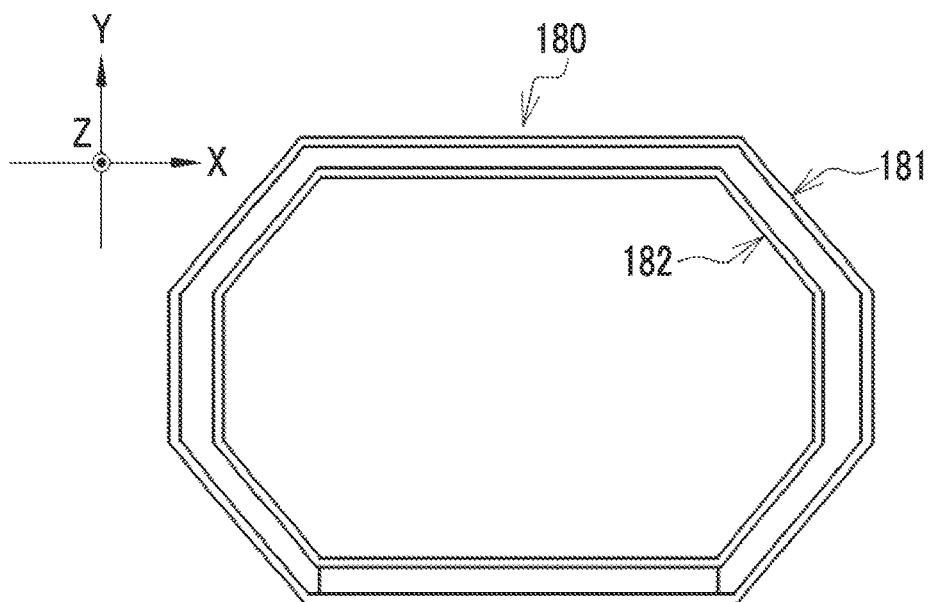
FIG. 15 is a diagram showing an octagonal first heat conductive member.
Figure 16:
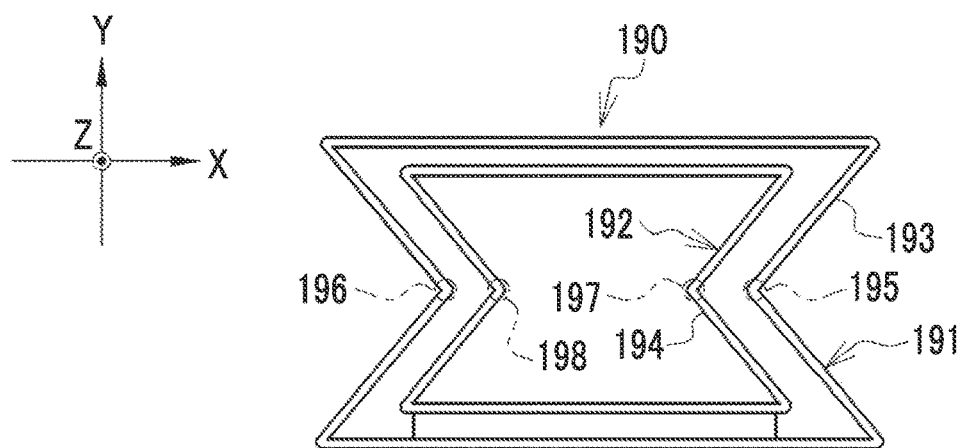
FIG. 16 is a diagram showing a first heat conductive member in which corners of connecting portions of an outer layer portion and corners of connecting portions of an inner layer portion are recessed inward.

The number of inner layer portions 111 is not limited to one. For example, as in the case of a first heat conductive member 170 shown in FIG. 14, the first heat conductive member may have has a three-layered structure that includes one outer layer portion 171 and two inner layer portions 172 and 173 disposed in a space surrounded by the outer layer portion 171. Further, the shape of the first heat conductive member is not limited to a hexagonal shape. For example, as in the case of a first heat conductive member 180 shown in FIG. 15, an outer layer portion 181 and an inner layer portion 182 may have an octagonal shape. Furthermore, for example, as shown in FIG. 16, a first heat conductive member 190 in which corners 195 and 196 of connecting portions 193 of an outer layer portion 191 and corners 197 and 198 of connecting portions 194 of an inner layer portion 192 are recessed inward may be provided. The first heat conductive member 190 has, so to speak, a shape in which "1" and a mirror image thereof are combined with each other.

Second Embodiment

Figure 17:
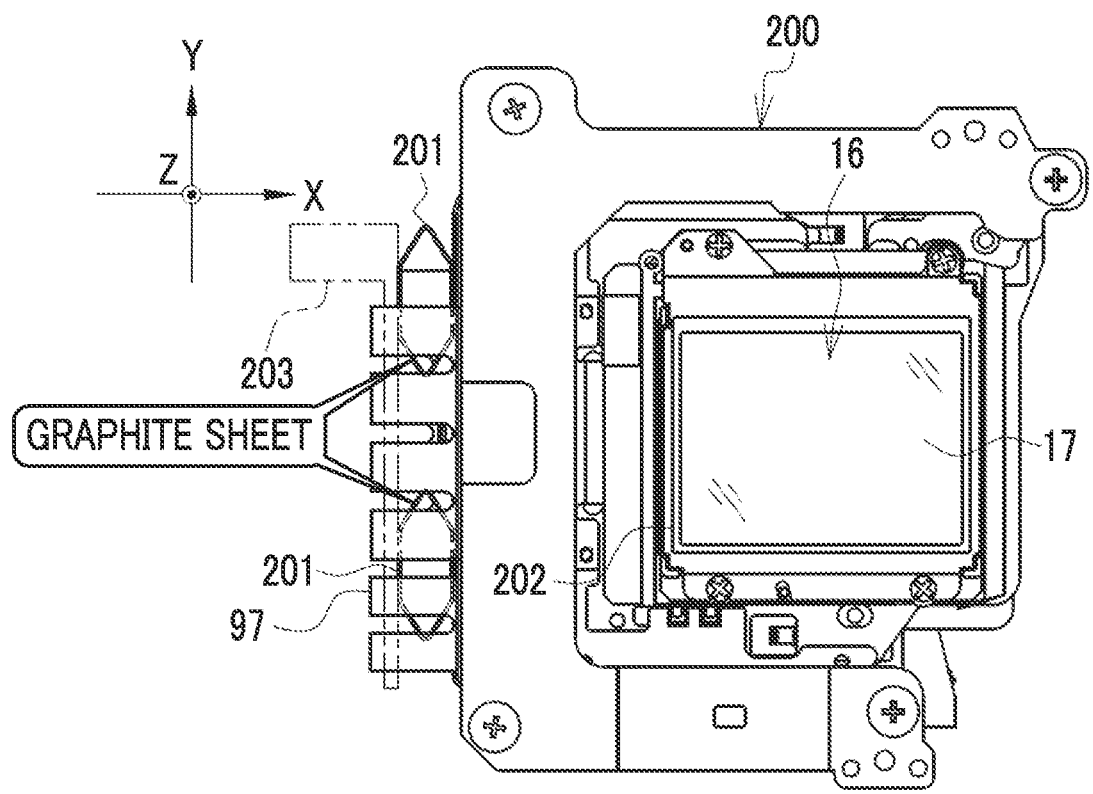
FIG. 17 is a diagram showing an imaging element unit including a fifth heat conductive member.
Figure 18:
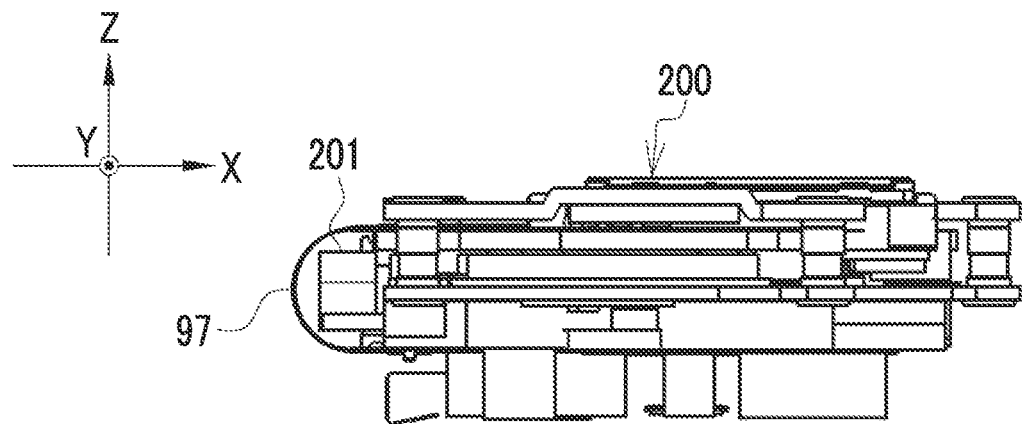
FIG. 18 is a diagram showing the imaging element unit including the fifth heat conductive member.

For example, as shown in FIGS. 17 and 18, an imaging element unit 200 of a second embodiment includes fifth heat conductive members 201. The fifth heat conductive members 201 are disposed in a space formed at a position, which faces a side surface 202 of the imaging element 16 connecting the imaging surface 17 and the back surface 89, by the flexible board 97 that is connected to the imaging element 16 and wraps around the front surface of the movable member 31. Driving heat of the imaging element 16 is conducted to the fifth heat conductive members 201 from the side surface 202. Further, a sixth heat conductive member 203 formed of a metal plate is connected to the fifth heat conductive members 201. The sixth heat conductive member 203 is connected to a side plate or the like of the camera body 10. The driving heat from the fifth heat conductive members 201 is conducted to the camera body 10 via the sixth heat conductive member 203.

Each of the fifth heat conductive members 201 is formed of the same graphite sheet as the first heat conductive member 100 and the like, and has high elasticity. As with the first heat conductive member 100 and the like, the fifth heat conductive members 201 are deformed to be capable of following the movement of the imaging element 16 caused by the anti-vibration function. However, unlike the first heat conductive member 100 and the like, the fifth heat conductive member 201 has a structure that does not include an inner layer portion.

Figure 19:
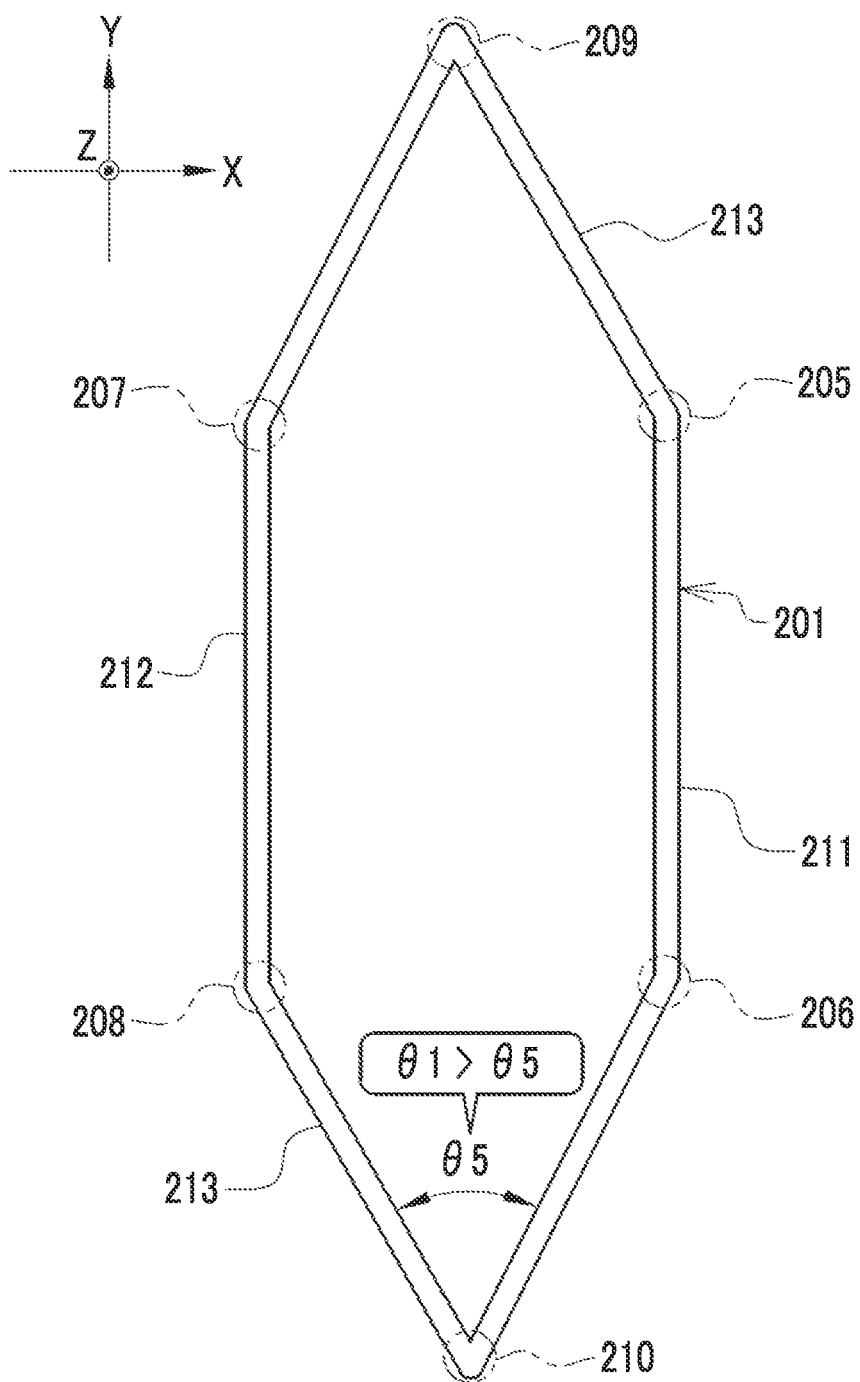
FIG. 19 is a simple plan view of the fifth heat conductive member.

For example, as shown in FIG. 19, the fifth heat conductive member 201 has a hexagonal shape that has six corners 205, 206, 207, 208, 209, and 210 as with the first heat conductive member 100. The corners 205 to 210 function as bent portions that allow the fifth heat conductive member 201 to be deformable to follow the movement of the imaging element 16 caused by the anti-vibration function. Further, as with the first heat conductive member 100, the fifth heat conductive member 201 includes a first sheet portion 211, a second sheet portion 212 that has the same length as the first sheet portion 211 and faces the first sheet portion 211, and a pair of V-shaped connecting portions 213 that connects the first sheet portion 211 and the second sheet portion 212. Angles θ5 of the corners 209 and 210 of the connecting portions 213, which function as the bent portions, are acute angles smaller than angles θ1 (see FIG. 9) of the corners 144 and 145 and the corners 150 and 151 of the connecting portions 117 and 120 of the first heat conductive member 100 that function as the bent portions.

As described above, the imaging element unit 200 of the second embodiment includes the fifth heat conductive members 201. The fifth heat conductive members 201 are disposed at a position facing the side surface 202 of the imaging element 16 that connects the imaging surface 17 and the back surface 89. Driving heat is conducted to the fifth heat conductive members 201 from the side surface 202. The fifth heat conductive members 201 are deformed to be capable of following the movement of the imaging element 16 caused by the anti-vibration function. Each of the fifth heat conductive members 201 includes the bent portions that allow the fifth heat conductive member 201 to be deformable to follow the movement of the imaging element 16 caused by the anti-vibration function. Accordingly, it is possible to more effectively dissipate driving heat without hindering the movement of the imaging element 16 caused by the anti-vibration function.

The fifth heat conductive member 201 includes the first sheet portion 211, the second sheet portion 212 that faces the first sheet portion 211, and the connecting portions 213 that connect the first sheet portion 211 and the second sheet portion 212. For this reason, the fifth heat conductive members 201 can be deformed without difficulty to follow the movement of the imaging element 16 caused by the anti-vibration function while ensuring the connecting portions with the sixth heat conductive member 203 and the like.

Further, the angles θ5 of the bent portions of the connecting portions 213 of the fifth heat conductive member are acute angles smaller than angles θ1 of the bent portions of the connecting portions 117 and 120 of the first heat conductive member 100. For this reason, a repulsive force of the fifth heat conductive member 201 can be reduced and the fifth heat conductive member 201 can be deformed without a large resistance to follow the movement of the imaging element 16 caused by the anti-vibration function. Furthermore, as a distance between the first sheet portion 211 and the second sheet portion 212 is reduced, the fifth heat conductive member 201 is made more compact than the first heat conductive member 100. For this reason, the fifth heat conductive members 201 can be disposed even in a relatively narrow space, such as a space formed by the flexible board 97 at a position facing the side surface 202 of the imaging element 16.

Each of the fifth heat conductive members 201 is formed of a graphite sheet. For this reason, the fifth heat conductive members 201 can be made to have an appropriate elasticity.

As with the first heat conductive member 100, the fifth heat conductive members 201 may have a multi-layered structure. Further, the fifth heat conductive member 201 may have an octagonal shape as in an example shown in FIG. 15. Furthermore, the fifth heat conductive member 201 may have a structure in which corners of connecting portions are recessed inward as in an example shown in FIG. 16.

The CPU 18 has been exemplified as a processor that controls the operation of the imaging element unit 15, but the processor is not limited thereto. A programmable logic device (PLD) that is a processor of which the circuit configuration can be changed after manufacture, such as a field programmable gate array (FPGA), a dedicated electrical circuit that has a circuit configuration designed exclusively to perform specific processing, such as an application specific integrated circuit (ASIC), and/or the like may be used instead of or in addition to the CPU 18.

The plates 45 to 47 are provided on the fixing member 30 and the recessed portions 70 to 72 are provided on the movable member 31 in the first embodiment, but the present disclosure is not limited thereto. The plates 45 to 47 may be provided on the movable member 31, and the recessed portions 70 to 72 may be provided on the fixing member 30. Further, the magnets 40 to 42 are provided on the fixing member 30 and the coils 60 to 62 are provided on the movable member 31 in the first embodiment, but the present disclosure is not limited thereto. The magnets 40 to 42 may be provided on the movable member 31 and the coils 60 to 62 may be provided on the fixing member 30.

The number of sets of the balls 35 to 37, the plates 45 to 47, and the recessed portions 70 to 72 is not limited to three and may be four or more.

The imaging element unit according to the embodiment of the present disclosure can also be applied to an imaging device other than the exemplified digital camera 2, for example, a smartphone, a tablet terminal, a monitoring camera, or the like.

Various embodiments and/or various modification examples described above can also be appropriately combined in the technique of the present disclosure. Further, it is natural that the present disclosure is not limited to each embodiment described above and may employ various configurations without departing from the scope.

The description contents and shown contents having been described above are the detailed description of portions according to the technique of the present disclosure, and are merely an example of the technique of the present disclosure. For example, the description of the configuration, functions, actions, and effects having been described above is the description of examples of the configuration, functions, actions, and effects of the portions according to the technique of the present disclosure. Accordingly, it goes without saying that unnecessary portions may be deleted or new elements may be added or replaced in the description contents and shown contents described above without departing from the scope of the technique of the present disclosure. Further, the description of common technical knowledge and the like, which allow the technique of the present disclosure to be embodied and do not need to be particularly described, is omitted in the description contents and shown contents, which have been described above, to avoid complication and to facilitate the understanding of portions according to the technique of the present disclosure.

In this specification, "A and/or B" is synonymous with "at least one of A or B". That is, "A and/or B" may mean only A, may mean only B, or may mean a combination of A and B. Further, in this specification, the same meaning as "A and/or B" is applied even in a case where three or more items are expressed to be connected using "and/or".

All documents, patent applications, and technical standards disclosed in this specification are incorporated in this specification by reference such that the incorporation of each of the documents, the patent applications, and the technical standards by reference is specific and is as detailed as that in a case where the documents, the patent applications, and the technical standards are described individually.

What is claimed is:

1. An imaging element unit that is built in a housing of an imaging device, the imaging element unit comprising:
    an imaging element that includes an imaging surface imaging a subject and a back surface opposite to the imaging surface;
    a circuit board which is mounted on the back surface and in which an opening causing a part of the back surface to be exposed therethrough is formed; and
    a first heat conductive member and a second heat conductive member to which driving heat of the imaging element is conducted,
    wherein the first heat conductive member is connected to the second heat conductive member and has elasticity higher than elasticity of the second heat conductive member, and
    the second heat conductive member is connected to the back surface via the opening.

2. The imaging element unit according to claim 1,
    wherein the imaging element unit has an anti-vibration function that moves the imaging element in plane directions of the imaging surface, and
    the first heat conductive member is deformed to be capable of following movement of the imaging element caused by the anti-vibration function.

3. The imaging element unit according to claim 1,
    wherein the second heat conductive member includes a first piece that is connected to the back surface and faces the back surface, and a second piece that is bent from the first piece, and
    the first heat conductive member is connected to the second piece.

4. The imaging element unit according to claim 3,
    wherein the second piece extends in a normal direction of the imaging surface and the back surface.

5. The imaging element unit according to claim 3, further comprising:
    a flexible board that is mounted on the circuit board,
    wherein the flexible board is disposed on one side of the second piece opposite to the first heat conductive member.

6. The imaging element unit according to claim 1,
    wherein a thermal conductivity of the second heat conductive member is higher than a thermal conductivity of the first heat conductive member.

7. The imaging element unit according to claim 6,
    wherein the second heat conductive member is thicker than the first heat conductive member.

8. The imaging element unit according to claim 1,
    wherein the opening causes a central region of the back surface to be exposed therethrough.

9. The imaging element unit according to claim 8,
    wherein the central region is a region in which identification information of the imaging element is written.

10. The imaging element unit according to claim 1,
    wherein the first heat conductive member is formed of a graphite sheet, and
    the second heat conductive member is made of metal.

11. An imaging device comprising:
    a housing; and
    the imaging element unit according to claim 1 that is built in the housing.

12. The imaging device according to claim 11, further comprising:

a third heat conductive member that is connected to the first heat conductive member, wherein the housing is connected to the third heat conductive member and the driving heat is conducted to the housing from the back surface.

13. The imaging device according to claim 12, wherein the housing and the third heat conductive member are connected to each other by a fourth heat conductive member, each of the first heat conductive member and the fourth heat conductive member is formed of a graphite sheet, and the fourth heat conductive member is thicker than the first heat conductive member.

* * * * *